United States Patent
Fujiwara et al.

(10) Patent No.: US 6,614,846 B1
(45) Date of Patent: Sep. 2, 2003

(54) METHOD AND APPARATUS FOR TRANSMITTING, ENCODING AND DECODING VIDEO SIGNAL AND RECORDING/REPRODUCING METHOD OF OPTICAL DISC

(75) Inventors: Yuji Fujiwara, Nishinomiya (JP); Masakazu Nishino, Kashiwara (JP); Seiichi Takeuchi, Neyagawa (JP); Kazuhiro Wake, Osaka (JP); Akifumi Ide, Kawanishi (JP); Toyohiko Matsuda, Katano (JP); Masaaki Kobayashi, Kawanishi (JP); Yoshitomi Nagaoka, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/117,793
(22) PCT Filed: Dec. 3, 1997
(86) PCT No.: PCT/JP97/04426
§ 371 (c)(1), (2), (4) Date: Dec. 17, 1998
(87) PCT Pub. No.: WO98/25407
PCT Pub. Date: Jun. 11, 1998

(30) Foreign Application Priority Data

Dec. 6, 1996 (JP) .............................. 8-326612
Mar. 26, 1997 (JP) .............................. 9-073111
Jun. 2, 1997 (JP) .............................. 9-143602
Jul. 1, 1997 (JP) .............................. 9-175433

(51) Int. Cl.$^7$ ............................ H04B 1/66; H04N 7/12; G06K 9/36
(52) U.S. Cl. ................ 375/240.16; 382/236; 348/416.1
(58) Field of Search ................. 375/240.16, 240.25, 375/240.27, 240.11, 240.14, 240.12, 240.21; 382/236, 252, 232; 348/385.1, 416.1, 402.1, 407.1, 397.1, 445, 452

(56) References Cited

U.S. PATENT DOCUMENTS

| | | | | |
|---|---|---|---|---|
| 4,979,037 A | * | 12/1990 | Mizutani et al. | 375/240.21 |
| 5,459,514 A | * | 10/1995 | Sakamoto et al. | 375/240.11 |
| 5,485,279 A | * | 1/1996 | Yonemitsu et al. | 375/240.14 |
| 5,737,019 A | * | 4/1998 | Kim | 375/240.25 |
| 5,832,124 A | * | 11/1998 | Sato et al. | 375/240.12 |

FOREIGN PATENT DOCUMENTS

| | | |
|---|---|---|
| JP | 2-62176 | 3/1990 |
| JP | 4-13246 | 1/1992 |
| JP | 5-56413 | 3/1993 |
| JP | 6-78292 | 3/1994 |
| JP | 6-153183 | 5/1994 |
| JP | 7-107467 | 4/1995 |
| JP | 8-307896 | 11/1996 |

OTHER PUBLICATIONS

Japanese language search report for Int'l Appln No. PCT/JP97/04426 dated Apr. 14, 1998.
Form PCT/ISA/210.

* cited by examiner

Primary Examiner—Gims S. Philippe
(74) Attorney, Agent, or Firm—RatnerPrestia

(57) ABSTRACT

The present invention includes a motion vector detector for detecting motion vectors using a first image signal of high resolution; a resolution reducer for creating a second image signal of low resolution from the first image signal; an image signal interpolater for interpolating the second image signal so that it has the same number of pixels as the first image signal, thereby creating an interpolated signal; a differentiator for determining a differential between the first image signal and the interpolated signal; and an encoder for using the motion vectors to high-efficiency-encode the differential signal. Thus, by encoding two types of image signals of different resolutions, the present invention improves the accuracy of the motion vectors during the encoding of the high-resolution signal and reduces the rate after encoding due to the encoding of the differential signal.

3 Claims, 29 Drawing Sheets

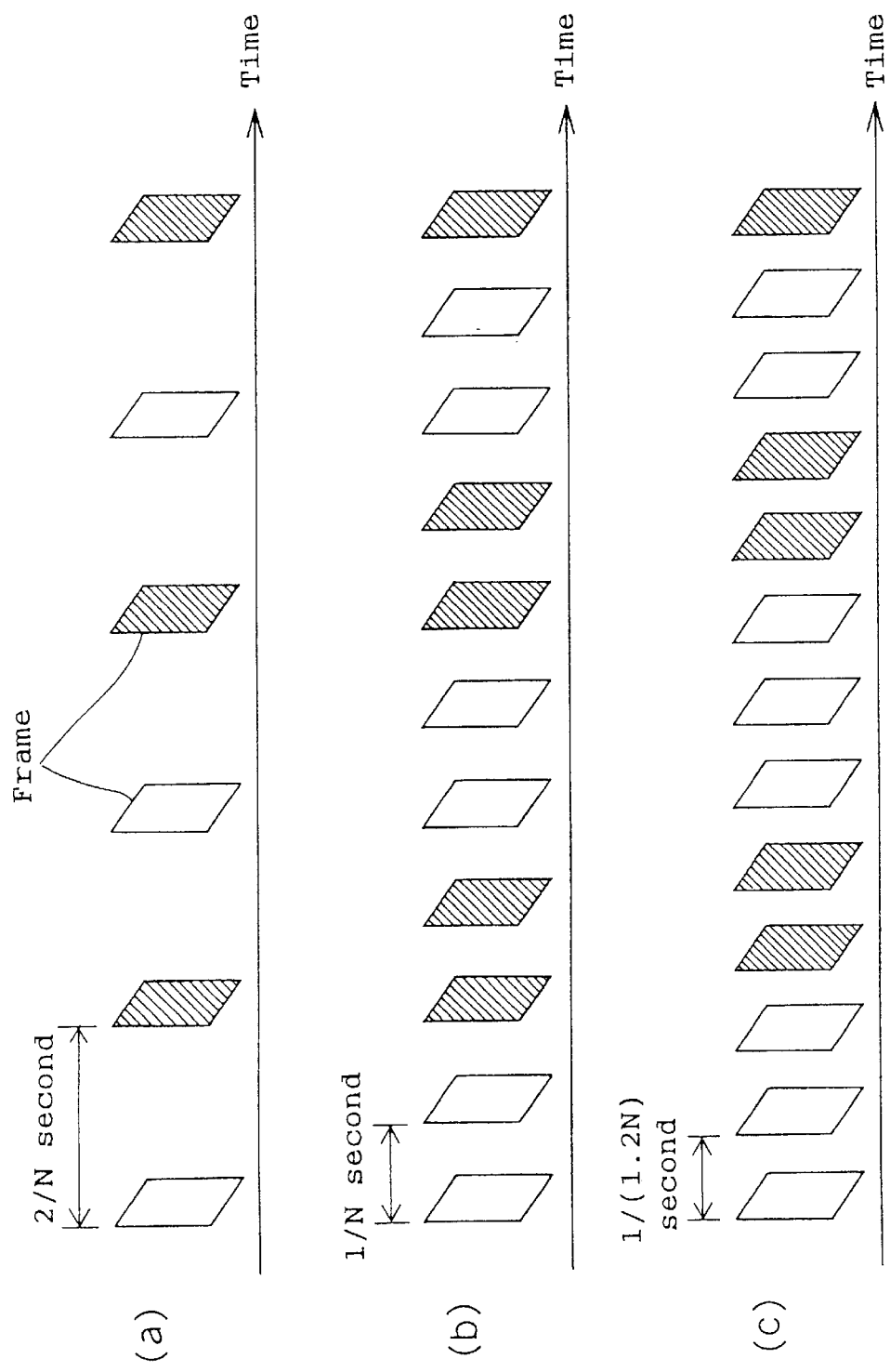

METHOD AND APPARATUS FOR TRANSMITTING, ENCODING AND DECODING VIDEO SIGNAL AND RECORDING/REPRODUCING METHOD OF OPTICAL DISC

THIS APPLICATION IS A U.S. NATIONAL PHASE APPLICATION OF PCT INTERNATIONAL APPLICATION PCT/JP97/04426.

TECHNICAL FIELD

The present invention relates to methods for low-efficiency-encoding and -decoding and transmitting two types of image signals which have different resolution or progressive scanning signals, and methods for recording and reproducing these signals on and from an optical disc, as well as apparatuses for realizing these methods.

BACKGROUND ART

At present MPEG2 is standardized as a method for applying high-efficiency-encoding TV signals. MPEG2 is characterized in that it enables high-image-quality recording and transmission at a relatively low data rate and in that it enables compression to various data rates. One method according to MPEG2 executes encoding and decoding using the correlationship between high-resolution signals and low-resolution signals.

This encoding method executes encoding by detecting motion vectors using as a reference frame a high-resolution image or an image obtained by increasing the resolution of an image obtained by encoding and decoding a low-resolution signal. The above decoding method executes decoding with applying motion compensation using as a reference frame both a decoded high-resolution image and an image obtained by increasing the resolution of a decoded low-resolution image.

According to such conventional encoding and decoding methods, if the reference image for the motion vector is changed from a low-resolution signal to an up-convert image, the motion vector becomes less accurate. In addition, since a high-resolution signal is directly encoded, the data rate increases during encoding. In addition, due to the complexity of the encoding method, the decoding method is also complicated, resulting in the need to increase the size of a circuit for realizing both methods.

MPEG2 also defines a method for transmitting a signal obtained by encoding a high-resolution signal using the correlationship between this signal and a low-resolution signal. This method multiplexes a high-resolution signal and a low-resolution signal which have been low-efficiency-encoded before transmitting these signals.

According to a transmission apparatus for realizing such a conventional transmission method, if the broadcasting of high-resolution signals is started, viewers having a conventional decoder compatible with low-resolution signals cannot view the broadcasting.

In addition, when MPEG2 encodes progressive scanning signals, it uses as an input image to encode, a 4:2:0p signal (hereafter referred to as a "420p signal") that is obtained by down-sampling color difference signals of the progressive scanning signals.

On the other hand, there is another type of 4:2:0p signal defined by SMPTE294M that is a transmission standard as the 4:2:0p signal obtained by down-sampling color difference signals for progressive scanning signals. Both signals are obtained by down-sampling color difference signals of progressive scanning signals, but have different color-difference-signal sampling positions relative to a luminance signal. Thus, to use MPEG2 to encode a 420p signal transmitted using SMPTE294M, an input signal must be up-converted to an 844 signal and then down-converted to a 420p signal of the phase of a color difference signal according to the MPEG standard, followed by MPEG compression. On the contrary, to use SMPTE294M to decode and transmit a 4:2:0p signal that has been MPEG2-compressed, a decoded signal must be up-converted to an 844 signal and then down-converted to a 420p signal of the phase of a color difference signal according to the SMPTE294M standard, followed by transmission.

According to such conventional image-signal encoding, decoding, and transmission methods and apparatuses using these methods, a color difference signal is converted twice between the apparatuses and may thus be degraded.

In addition, data encoded using the MPEG2 method is recorded on an optical disc for dense recording that is called a digital video disc (hereafter referred to as a "DVD"). At present, only NTSC- or PAL-based image signals that are interlaced scanning signals are recorded on a DVD, and progressive scanning signals that are image signals having more vertical scanning lines than the NTSC- or PAL-based signals have not been put to practical use yet.

When progressive scanning signals encoded using MPEG2 are recorded on a conventional optical disc, twice as many pixels as in interlaced scanning signals are required to force the data rate of a resulting bit stream to be increased. Such a high data rate may not be dealt with by the existing optical-disc standards. In addition, commercially available apparatuses cannot decode (playback) progressive image signals that have been recorded on an optical disc within a single stream, and this is inconvenient to users.

DISCLOSURE OF THE INVENTION

It is an object of this invention to provide an encoding apparatus for accurately determining motion vectors to encode two types of image signals of different resolutions and a decoding apparatus for decoding signals encoded by the encoding apparatus.

To achieve the above-mentioned object, the present invention is an image signal encoding apparatus comprising
  a motion vector detecting means for detecting motion vectors using a first image signal of a high resolution, a resolution reducing means for creating a second image signal of a low resolution from said first image signal, an image signal interpolating means for interpolating said second image signal in such a way as to have the same number of pixels as said first image signal, thereby creating an interpolated signal, a differential means for determining the differential between said first image signal and said interpolated signal to create a differential signal, and
  an encoding means for using said motion vectors to low-efficiency-encode said differential signal.

Further, the present invention is an image signal encoding apparatus comprising, a motion vector detecting means for detecting motion vectors using a first image signal of a high resolution, a resolution reducing means for creating a second image signal of a low resolution from said first image signal, a second encoding means for encoding said second image signal to create a second encoded signal, a second decoding means for decoding said second encoded signal to create a second decoded signal, an image signal interpolating means for interpolating said second decoded signal in such a way as to have the same number of pixels as said first image signal, thereby creating an interpolated signal, a differential means for determining the differential between said first image signal and said interpolated signal to create a differential signal, and a first encoding means for using said motion vectors to low-efficiency-encode said differential signal.

This configuration can accurately determine motion vectors and reduce the data rate after encoding by encoding differential signals.

Further, the present invention is an image signal decoding apparatus comprising a first decoding means for decoding a first stream obtained by encoding a high-resolution signal to obtain a first image signal, a second decoding means for decoding a second stream obtained by encoding a low-resolution signal to obtain a second image signal, an image signal interpolating means for interpolating said second image signal in such a way as to have the same number of pixels as said first image signal, thereby creating an interpolated signal, and an adding means for adding said first image signal and said interpolated signal to create a decoded signal for said high-resolution signal.

This configuration can use a simple circuit configuration to provide a decoding apparatus for signals encoded by the present encoding apparatus.

It is also an object of this invention to provide an image-signal transmission apparatus that enables viewers having a decoder for low-resolution signals to view broadcasting.

To achieve the above-mentioned object, the present invention is an image signal transmission apparatus comprising a dividing means for dividing an input image signal into a first image signal of a low resolution and a second image signal that can obtain the same resolution as said input image signal when combined with said first image signal, a first encoding means for low-efficiency-encoding said first image signal to obtain a first encoded signal, a second encoding means for low-efficiency-encoding said second image signal to obtain a second encoded signal, and a transmission means for transmitting said first and second encoded signals through a first and a second channels respectively that are different from each other.

This configuration transmits two types of signals of low and high resolutions to enable viewers having a decoder exclusively used for low-resolution signals to view broadcasting.

The present invention is an image signal transmission apparatus comprising a dividing means for dividing an input image signal into a first image signal of a low resolution and a second image signal that can obtain the same resolution as said input image signal when combined with said first image signal, a first encoding means for low-efficiency-encoding said first image signal to obtain a first encoded signal, a second encoding means for low-efficiency-encoding said second image signal to obtain a second encoded signal, a synchronizing-signal adding means for adding to said first and second encoded signals, a synchronizing signal that frame-synchronizes said first encoded signal with said second encoded signal in order to obtain a first and a second synchronized signals, and a transmission means for transmitting said first and second synchronized signals through a first and a second channels respectively that are different from each other.

This configuration transmits two types of signals of low and high resolutions to enable viewers having a decoder exclusively used for low-resolution signals to view broadcasting, and enables the low- and high-resolution signals to be simply synchronized.

The present invention is an image signal transmission apparatus comprising a dividing means for dividing an input image signal into a first image signal of a low resolution and a second image signal that can obtain the same resolution as said input image signal when combined with said first image signal, a first encoding means for low-efficiency-encoding said first image signal to obtain a first encoded signal, a second encoding means for low-efficiency-encoding said second image signal to obtain a second encoded signal, a billing information adding means for adding billing information to said second encoded signal to obtain a billed signal, and a transmission means for transmitting said first encoded signal and said billed signal through a first and a second channels respectively that are different from each other.

This configuration enables viewers having a decoder exclusively used for low-resolution signals to view broadcasting, and can impose a fee on only those viewers who receive high-resolution signals.

The present invention is an image signal transmission apparatus comprising a dividing means for dividing an input image signal into a first image signal of a low resolution and a second image signal that can obtain the same resolution as said input image signal when combined with said first image signal, a first encoding means for low-efficiency-encoding said first image signal to obtain a first encoded signal, a second encoding means for low-efficiency-encoding said second image signal to obtain a second encoded signal, an encryption means for encrypting said second encoded signal to create an encrypted signal, and a transmission means for transmitting said first encoded signal and said encrypted signal through a first and a second channels respectively that are different from each other.

This configuration enables viewers having a decoder exclusively used for low-resolution signals to view broadcasting, and can more efficiently compress signals the resolution of which is to be increased.

The present invention is an image signal transmission apparatus comprising a dividing means for dividing an input image signal into a first image signal of a low resolution and a second image signal that can obtain the same resolution as said input image signal when combined with said first image signal, a first encoding means for low-efficiency-encoding said first image signal to obtain a first encoded signal, a second encoding means for low-efficiency-encoding said second image signal to obtain a second encoded signal, and a transmission means operative when transmitting said first and second encoded signals using a first and a second channels respectively that are different from each other, for transmitting said second encoded signal prior to said first encoded signal, said first and second encoded signals corresponding to the same frame of said input image signal.

This configuration enables viewers having a decoder exclusively used for low-resolution signals to view broadcasting, and eliminates time loss during broadcasting caused by the decoding of high-resolution signals.

The present invention is an image signal transmission apparatus comprising a dividing means for dividing an input image signal into a first image signal of a low resolution and a second image signal that can obtain the same resolution as said input image signal when combined with said first image signal, a first encoding means for low-efficiency-encoding said first image signal to obtain a first encoded signal, a second encoding means for low-efficiency-encoding said second image signal to obtain a second encoded signal, a first error correction information adding means for adding error correction information to said first encoded signal, a second error correction information adding means for adding error correction information to said second encoded signal, and a transmission means for transmitting through a first channel the first encoded signal with said error correction information added thereto while transmitting through a data transmitting channel the second encoded signal with said error correction information added thereto, wherein less error correction information is added to said second encoded signal than the other data transmitted through said data transmitting channel.

This configuration transmits two types of signals of low and high resolutions to enable viewers having a decoder exclusively used for low-resolution signals to view broadcasting, and can more efficiently encode signals the resolution of which is to be increased.

The present invention is an image signal transmission apparatus comprising a dividing means for dividing an input image signal into a first image signal of a low resolution and a second image signal that can obtain the same resolution as said input image signal when combined with said first image signal, a first encoding means for low-efficiency-encoding said first image signal to obtain a first encoded signal, a second encoding means for low-efficiency-encoding said second image signal to obtain a second encoded signal, and a transmission means for transmitting said first and second encoded signals through a first and a second channels, respectively, and transmitting through said first and second channels an audio signal synchronizing with said input image signal.

This configuration enables viewers having a decoder exclusively used for low-resolution signals to view broadcasting, and enables only audio signals to be broadcasted if low-resolution signals cannot be decoded.

The present invention is an image signal transmission apparatus comprising a dividing means for dividing an input image signal into a first image signal of a low resolution and a second image signal that can obtain the same resolution as said input image signal when combined with said first image signal, a first encoding means for low-efficiency-encoding said first image signal to obtain a first encoded signal, a second encoding means for low-efficiency-encoding said second image signal to obtain a second encoded signal, and a transmission means operative when transmitting said first and second encoded signals through a first and a second channels, respectively, for transmitting only through said first channel an audio signal synchronizing with said input image signal.

This configuration enables viewers having a decoder exclusively used for low-resolution signals to view broadcasting, enables only audio signals to be broadcasted if low-resolution signals cannot be decoded, and can improve the encoding efficiency for signals the resolution of which is to be increased. This configuration enables viewers having a decoder exclusively used for low-resolution signals to view broadcasting, and enables viewers who can receive high-resolution signals to use acoustic effects.

The present invention is an image signal transmission apparatus comprising a dividing means for dividing an input image signal into a first image signal of a low resolution and a second image signal that can obtain the same resolution as said input image signal when combined with said first image signal, a first encoding means for low-efficiency-encoding said first image signal to obtain a first encoded signal, a second encoding means for low-efficiency-encoding said second image signal to obtain a second encoded signal, and a transmission means operative when transmitting said first and second encoded signals through a first and a second channels, respectively, for transmitting through said first channel an audio signal synchronizing with said input image signal while transmitting through the second channel a signal related to said audio signal.

This configuration enables viewers having a decoder exclusively used for low-resolution signals to view broadcasting. For viewers having a decoder compatible with high-resolution signals, even if a broadcasting source provides only low-resolution signals, this configuration can improve the image quality of the low-resolution signals.

The present invention is an image signal transmission apparatus comprising a determining means for receiving an input image signal and determining whether the input image signal has a high or low resolution, a first dividing means operative when the result of the determination by the determining means is for a high resolution, for dividing said input image signal into a first image signal of a low resolution and a second image signal that can obtain the same resolution as said input image signal when combined with said first image signal, a first encoding means for low-efficiency-encoding said first image signal and the third image signal described below to obtain a first encoded signal, a second encoding means for low-efficiency-encoding said second image signal to obtain a second encoded signal, a second dividing means operative when the result of the determination by the determining means is for a low resolution, for dividing said input image signal into a third image signal and a fourth image signal that is the differential between said input image signal and said third image signal or between said input image signal and an encoded/decoded signal of said third image signal, a third encoding means for low-efficiency-encoding said fourth image signal to obtain a third encoded signal, and a transmission means for transmitting said first encoded signal through a first channel while transmitting said second and third encoded signals through a second channel.

This configuration enables viewers having a decoder exclusively used for low-resolution signals to view broadcasting, and can improve the image quality of a high-resolution mode.

The present invention is an image signal transmission apparatus comprising a conversion encoding means for converting an input image signal into a first image signal of a low resolution and low-efficiency-encoding it to obtain a first encoded signal, a reverse-conversion decoding means for decoding and reversely converting said first encoded signal to obtain a decoded signal having the same resolution as said input image signal, a differential-image creating means for determining the differential between said decoded signal and said input image signal to create a second image signal, a second encoding means for low-efficiency-encoding said second image signal to obtain a second encoded signal, and a transmission means for transmitting said first encoded signal through a first channel while transmitting the second encoded signal through a second channel.

This configuration enables viewers having a decoder exclusively used for low-resolution signals to view broadcasting.

The present invention is an image signal transmission apparatus comprising a dividing means for dividing an input image signal into a first image signal of a low resolution and a second image signal that can obtain the same resolution as said input image signal when combined with said first image signal, a first encoding means for low-efficiency-encoding said first image signal to obtain a first encoded signal, a differential creating means for decoding said first encoded signal and determining the differential between this signal and said first image signal to determine a differential image signal, a second encoding means for low-efficiency-encoding said differential image signal to obtain a second encoded signal, a third encoding means for low-efficiency-encoding said second image signal to obtain a third encoded signal, and a transmission means for transmitting said first encoded signal through a first channel while transmitting said second and third encoded signals through a second channel.

For viewers having a decoder compatible with high-resolution signals, even if a broadcasting source provides only low-resolution signals, this configuration can improve the image quality of the low-resolution signals, thereby improving the image quality of the high-resolution signals.

It is another object of this invention to provide an image-signal transmission method and apparatus, an image-signal encoding method and apparatus, and an image-signal decoding method and apparatus that can reduce the degradation of the image quality of color difference signals for progressive scanning signals used to improve the efficiency in encoding and decoding.

The present invention is an image signal transmission method wherein progressive scanning signals are transmitted which include information indicating the sample position of a color difference signal relative to a luminance signal.

Further, the present invention is an image signal transmission apparatus including a conversion means for using digitalized progressive scanning signals as an input signal to convert both the phase of a color difference signal in said input signal and the number of samples or only the number of samples, and a multiplexing means for multiplexing together an output signal from said conversion means and information indicating the sample position of the color difference signal after conversion by said conversion means.

When a transmitted signal is to be low-efficiency-encoded, this configuration enables a color difference signal to be converted appropriately based on information indicating the sample position of the color difference signal in order to avoid the unwanted degradation of the color difference signal. This configuration also enables a plurality of image signals to be transmitted over the same transmission path.

The present invention is an image signal transmission apparatus comprising a color difference information reading means for using as an input signal, digitalized progressive scanning signals that are multiplexed with information indicating the sample position of a color difference signal in order to read the information indicating the sample position of said color difference signal which is multiplexed in said input signal, and a conversion means for converting both the phase of the color difference signal in said input signal and the number of samples or only the number of samples depending on said information read by said color difference information reading means.

This configuration converts both the phase of a color difference signal in an input signal and the number of samples, or only the number of samples to enable the color difference signal to be converted appropriately depending on information read by the color difference information reading means, thereby avoiding the unwanted degradation of the color difference signal.

Further, the present invention is an image signal encoding method wherein a low-efficiency-encoded image signal is multiplexed with information indicating the sample position of a color difference signal relative to a luminance signal.

When low-bit-rate-encoded data is to be decoded, this configuration avoids the unwanted degradation of a color difference signal caused by an error in conversion in order to enable a plurality of types of signals to be encoded by the same encoder.

The present invention is an image signal encoding apparatus comprising a conversion means for using digitalized progressive scanning signals as an input signal to convert both the phase of a color difference signal in said input signal and the number of samples or only the number of samples, an encoding means for low-efficiency-encoding an output signal from said conversion means, and a multiplexing means for multiplexing together the output from said encoding means and information indicating the sample position of the color difference signal after conversion by said conversion means.

This configuration multiplexes an encoded signal and information indicating the sample position of a color difference signal after conversion to enable appropriate conversion during decoding in order to prevent the unwanted degradation in image quality of the color difference signal.

The present invention is an image signal decoding apparatus comprising a decoding means for using as an input signal, low-efficiency-encoded progressive scanning signals that are multiplexed with information indicating the sample position of a color difference signal in order to low-efficiency-decode said input signal, a color difference information reading means for reading the information indicating the sample position of said color difference signal which is multiplexed in said input signal, and a conversion means for converting both the phase of the color difference signal in an output signal of said decoding means and the number of samples or only the number of samples depending on said information read by said color difference information reading means.

This configuration converts both the phase of a color difference signal of a decoded signal and the number of samples, or only the number of samples to enable the color difference signal to be converted appropriately depending on information on the sample position of a read color difference signal, thereby reducing the unwanted degradation in image quality of the color difference signal.

The present invention is an image signal encoding apparatus comprising an encoding means for using as an input signal, digitalized progressive scanning signals that are multiplexed with information indicating the sample position of a color difference signal in order to low-efficiency-encode said input signal, a color difference information reading means for reading the information indicating the sample position of said color difference signal which is multiplexed in said input signal, and a multiplexing means for multiplexing together the output from said encoding means and the information read by said color difference information reading means.

This configuration multiplexes an encoded signal and information on the sample position of a read color difference signal to enable compression without the duplicate application of a color filter in order to reduce the degradation in image quality of the color difference signal.

The present invention is an image signal decoding apparatus comprising a decoding means for using as an input signal, low-efficiency-encoded progressive scanning signals that are multiplexed with information indicating the sample position of a color difference signal in order to low-efficiency-decode said input signal, a color difference information reading means for reading the information indicating the sample position of said color difference signal which is multiplexed in said input signal, and a multiplexing means for multiplexing together the output from said decoding means and the information read by said color difference information reading means.

This configuration multiplexes a decoded signal and information on the sample position of a read color difference signal to enable the phase of a color difference signal in an output signal to be determined during decoding, thereby multiplexing the output signal and information on the sample position of the color difference signal so as to enable the color difference signal to be converted appropriately.

The present invention is an image signal encoding apparatus comprising a conversion means for using digitalized progressive scanning signals as an input signal to convert both the phase of a color difference signal in said input signal and the number of samples or not to convert them depending on said input signal, an encoding means for low-efficiency-encoding an output signal from said conversion means, and a multiplexing means for multiplexing together the output from said encoding means and information indicating the sample position of the color difference signal in the output signal from said conversion means.

This configuration can multiplex an encoded signal and information indicating the sample position of a color difference signal in an input signal in order to enable compression without the duplicate application of a color filter, thereby preventing the unwanted degradation in image quality of the color difference signal.

The present invention is an image signal decoding apparatus comprising a decoding means for using as an input signal, low-efficiency-encoded progressive scanning signals that are multiplexed with information indicating the sample position of a color difference signal in order to low-efficiency-decode said input signal, a color difference information reading means for reading the information indicating the sample position of said color difference signal which is multiplexed in said input signal, and a conversion means for converting both the phase of the color difference signal in respect to said output signal of said decoding means and the number of samples or not to convert them depending on said information read by said color difference information reading means.

This configuration converts or does not convert the phase of the color difference signal relative to an output signal and the number of samples depending on information on the sample position of a read color difference signal to enable the color difference signal to be processed appropriately, thereby reducing the degradation of the image quality.

It is yet another object of this invention to provide an optical disc recording method compatible with progressive image signals without substantially changing conventional apparatuses.

The present invention is an optical-disc recording method comprising dividing for each frame a progressive image signal at a frame rate N (N is a positive real number indicating the number of frames per second) into two progressive image signals at a frame rate smaller than N, compressively encoding each of the two divided progressive signals to obtain two bit streams, and recording said two bit streams on different recording layers of an optical disc.

This configuration enables conventional compressive encoding for interlaced image signals to be directly used or allows progressive image signals to be directly compressed, thereby preventing the encoding efficiency from decreasing due to division.

It is yet another object of this invention to provide an optical disc reproduction method compatible with progressive image signals without substantially changing conventional apparatuses.

The present invention is an optical disc reproduction method comprising reproducing two bit streams from each of different recording layers of the optical disc on which two progressive image signals at a frame rate smaller than N obtained by dividing a progressive image signal at a frame rate N (N is a positive real number indicating the number of frames per second) are each recorded as the compressively encoded bit stream; extensionally decoding the bit streams to obtain two progressive image signals at said frame rate smaller than N, synthesizing the two progressive image signals for each frame, and outputting a progressive image signal at said frame rate N.

This configuration provides an apparatus that uses conventional extensional decoding means for interlaced image signals to playback an optical disc for progressive image signals.

The present invention is an optical disc reproduction method for reproducing an optical disc on which two progressive image signals at a frame rate smaller than N obtained by dividing a progressive image signal at a frame rate N (N is a positive real number indicating the number of frames per second) are each recorded a compressively encoded bit stream, wherein the method comprises reproducing only one recording layer to obtain a bit stream, extensionally decoding the bit stream, and outputting it as a progressive image signal at said frame rate smaller than N.

This configuration enables conventional extensional decoding means for interlaced image signals to be directly used to playback progressive image signals of a frame rate N/2.

BRIEF DESCRIPTION OF THE DRAWINGS

FIG. 29 is a conceptual drawing showing a frame interpolation operation in an optical-disc reproduction method according to the thirtieth embodiment.

BEST MODE FOR CARRYING OUT THE INVENTION

This invention is described below with reference to drawings showing its embodiments.

Embodiment 1

Figure 1:
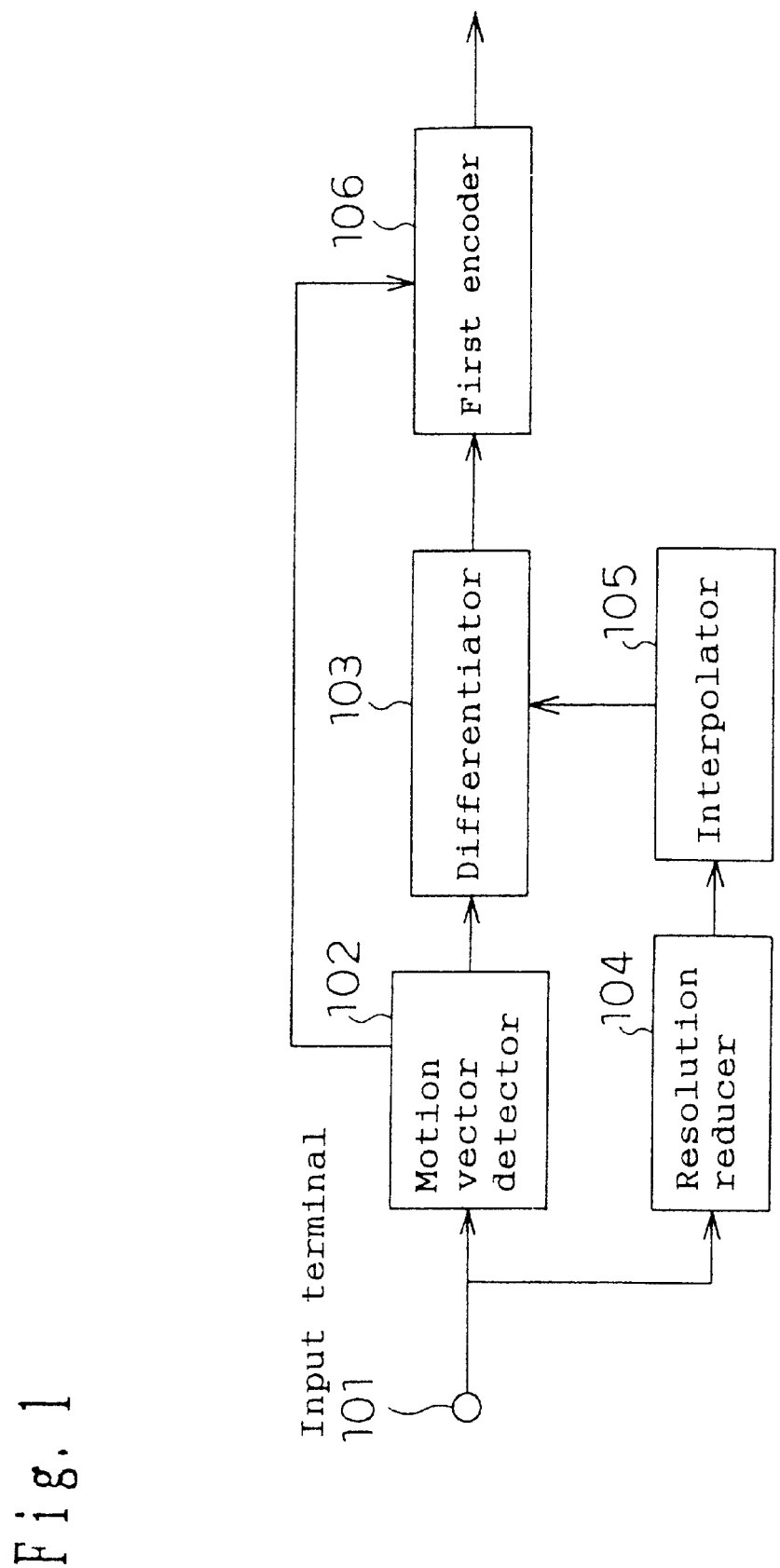
FIG. 1 is a block diagram describing an encoding apparatus according to a first embodiment of this invention.

FIG. 1 describes an encoding apparatus according to a first embodiment of this invention. Reference numeral 101 is an input terminal that inputs an image signal as a first image signal; 102 is a motion vector detector that detects motion vectors in an input image signal; 103 is a differentiator that determines the differential between input images to generate a differential signal; 104 is a resolution reducer that reduces the resolution of an input signal down to a predetermined value to generate a second image signal; 105 is an interpolator as an image signal interpolating means for interpolating the input second image signal such that the number of pixels therein becomes a specified value (in this case, the number of pixels in the input image signal) in order to generate an interpolated signal; and 106 is a first encoder as an encoding means for encoding an input differential signal based on the input motion vectors.

An operation of this configuration is described below.

A high-resolution signal input from the input terminal 101 is input to the motion vector detector 102 and the resolution reducer 104. The motion vector detector 102 determines the motion vectors of the input signal and outputs the input image to the differentiator 103 and the motion vectors to the first encoder 106. The resolution reducer 104 reduces the resolution of the input signal down to a predetermined value and then outputs the signal to the interpolator 105. The interpolator 105 interpolates the input signal so that the number of pixels therein equals that in the high-resolution signal, and outputs the signal to the differentiator 103. The differentiator 103 determines the differential between the pixels in data corresponding to the same input frame and outputs it to the first encoder 106. The first encoder 106 encodes the input image using the input motion vectors.

As described above, the encoding apparatus according to this embodiment determines the motion vectors from the original image to enable the motion vectors to be detected accurately, and encodes the differential value to maintain the data rate at a low value after encoding.

Embodiment 2

Figure 2:
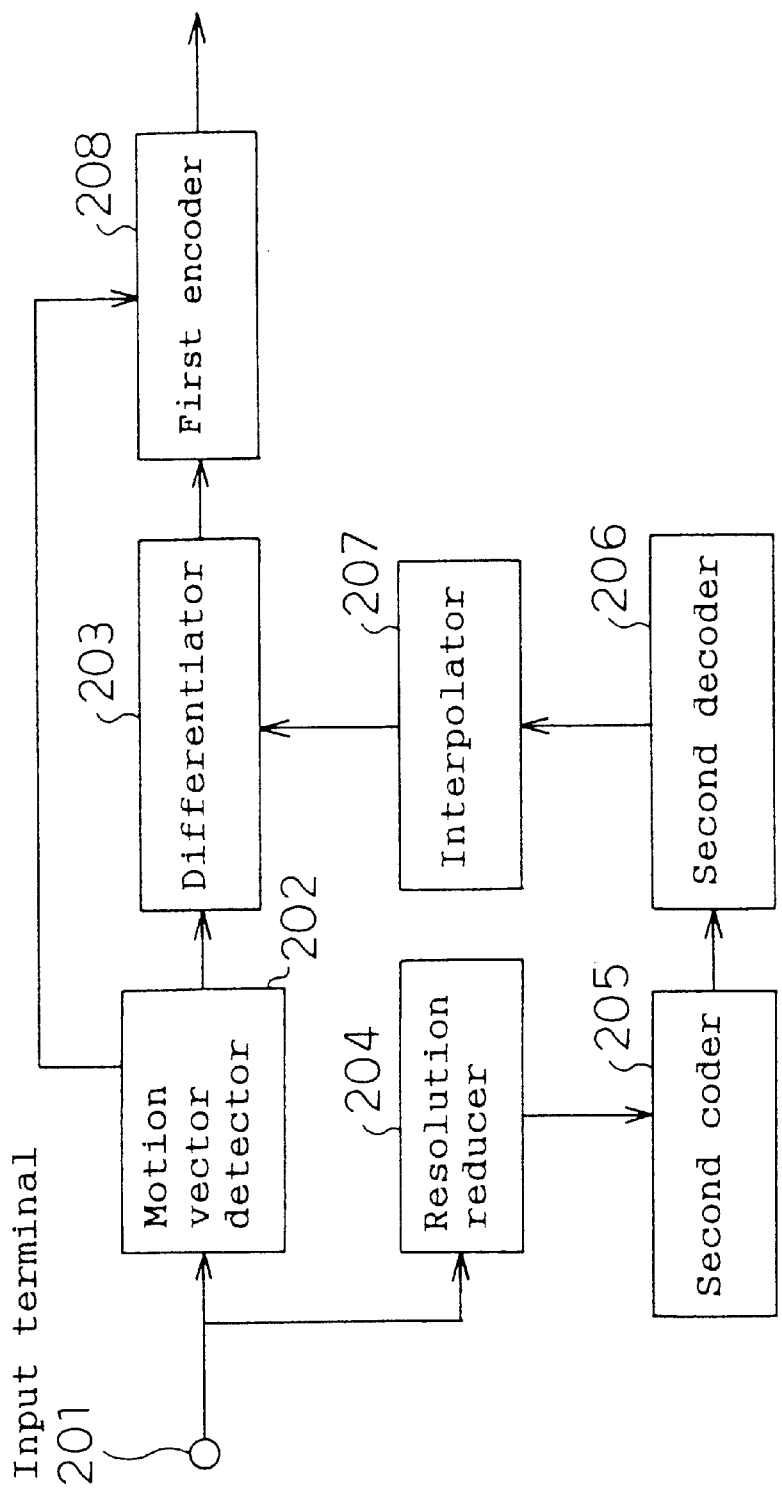
FIG. 2 is a block diagram describing an encoding apparatus according to a second embodiment of this invention.

FIG. 2 describes an encoding apparatus according to a second embodiment of this invention. Reference numeral 201 is an input terminal that inputs an image signal as a first image signal; 202 is a motion vector detector that detects motion vectors in an input image signal; 203 is a differentiator that determines the differential between input images to generate a differential signal; 204 is a resolution reducer that reduces the resolution of an input signal down to a predetermined value to generate a second image signal; 205 is a second encoder that encodes a second image signal to generate a second encoding signal; 206 is a second decoder that decodes an input second encoded signal in order to generate a second decoded signal; and 207 is an interpolator as an image signal interpolating means for interpolating the input second decoded signal such that the number of pixels therein becomes a specified value; and 208 is a first encoder that encodes an input differential signal based on the input motion vectors.

An operation of this configuration is described below.

A high-resolution signal input from the input terminal 201 is input to the motion vector detector 202 and the resolution reducer 204. The motion vector detector 202 determines the motion vectors of the input signal and outputs the input image to the differentiator 203 and the motion vectors to the first encoder 208. The resolution reducer 204 reduces the resolution of the input signal down to a predetermined value and then outputs the signal to the second encoder 205. The data encoded by the second encoder 205 is decoded by the second decoder 206 and output to the interpolator 207. The interpolator 207 interpolates the input signal so that the number of pixels therein equals that in the high-resolution signal, and outputs the signal to the differentiator 203. The differentiator 203 determines the differential between the pixels in data corresponding to the same input frame and outputs it to the first encoder 208. The first encoder 208 encodes the input image using the input motion vectors.

As described above, the encoding apparatus according to this embodiment determines the motion vectors from the original image to enable the motion vectors to be detected accurately, and encodes the differential value to maintain the data rate at a low value after encoding.

Embodiment 3

Figure 3:
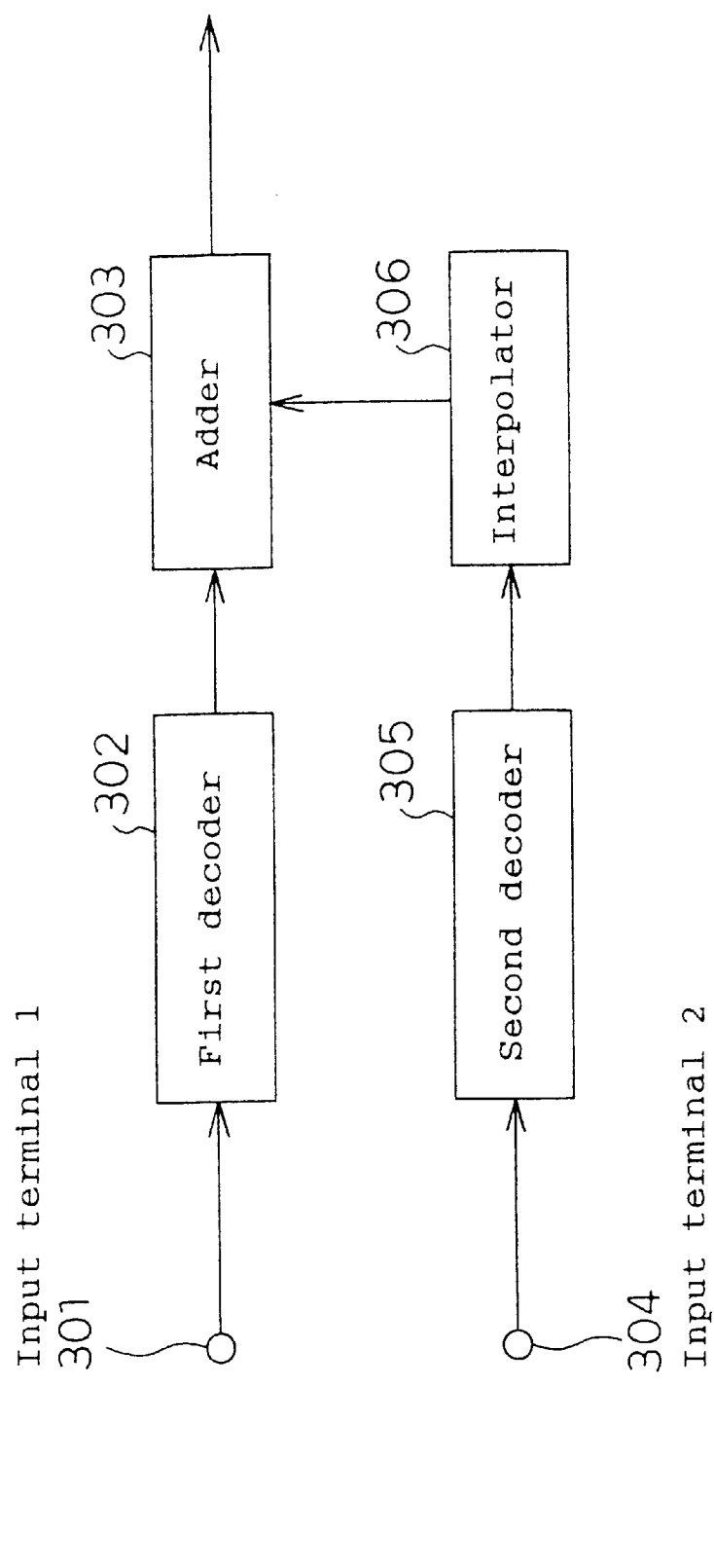
FIG. 3 is a block diagram describing a decoding apparatus according to a third embodiment of this invention.

FIG. 3 describes a decoding apparatus according to a third embodiment of this invention. Reference numeral 301 designates an input terminal 1 that inputs a high-resolution compressed stream; 302 is a first decoder that decodes an input stream; 303 is an adder that determines the sum of input images; 304 is an input terminal 2 that inputs a low-resolution compressed stream; 305 is a second decoder that decodes a low-resolution compressed stream; and 306 is an interpolator as an image-signal interpolating means for interpolating an input signal such that the number of pixels therein becomes a predetermined value.

An operation of this configuration is described below.

A compressed stream input from the input terminal 1-301 as a first stream of high-resolution signals is decoded by the first decoder 302 and output to the adder 303 as a first image signal. A compressed stream input from the input terminal 2-304 as a second stream of low-resolution signals is decoded by the second decoder 305 and output to the interpolator 306 as a second image signal. The interpolator 306 interpolates the input second image signal so that the number of pixels therein equals that in the high-resolution signal, and outputs the signal to the adder 303. The adder 303 adds to the signal, data on the same frame contained in the two input signals and outputs the resulting signal as a decoded signal for the high-resolution signal. The first and second decoders 302 and 305 have the same decoding function except for the number of pixels processed and conform to MPEG.

As described above, the decoding apparatus according to the present embodiment can decode the high-resolution stream with a simple configuration which merely adds the adder to the conventional decoding apparatus.

Embodiment 4

Figure 4:
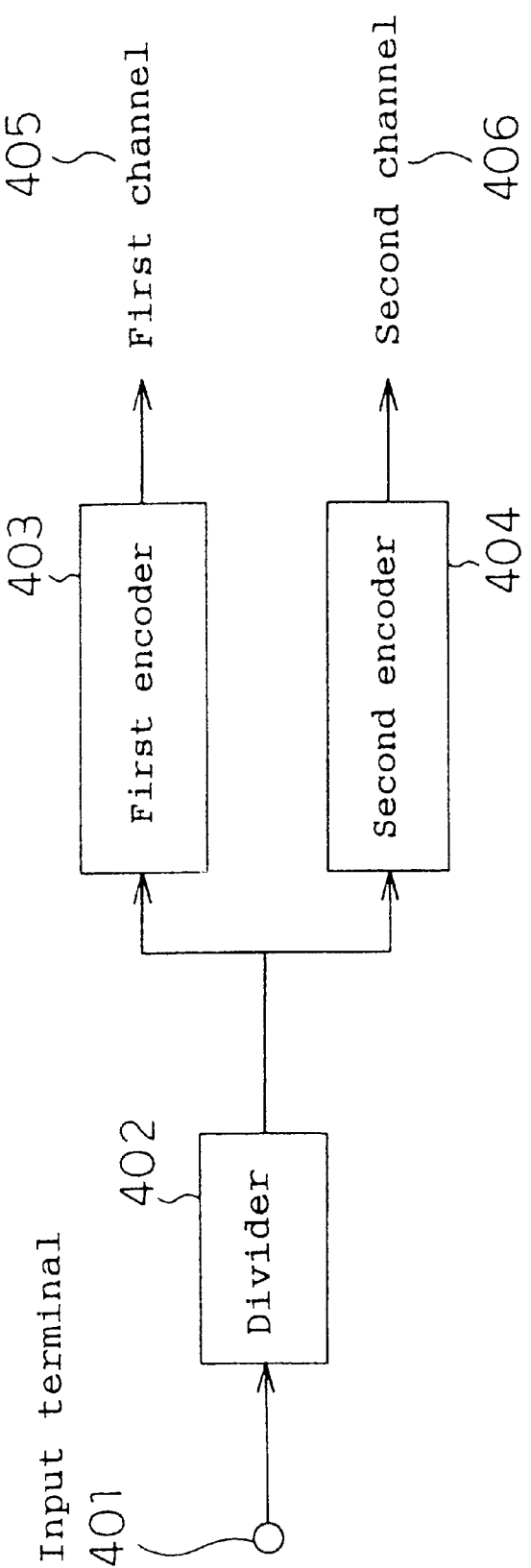
FIG. 4 is a block diagram describing an image-signal transmission apparatus according to a fourth embodiment of this invention.

FIG. 4 describes a fourth embodiment of this invention. Reference numeral 401 designates an input terminal that inputs an image signal; 402 is a divider that divides the input signal into two types of signals; 403 and 404 are a first and a second encoders that high-efficiency-encode the input signals; and 405 and 406 are a first and a second channels that are transmission paths as transmission means for transmitting the input signals. The two types of signals obtained after division are a first image signal having a lower resolution than the input image signal and a second image signal that can be combined with the first image signal to provide the same resolution as the input image signal. This applies to the dividers in the following embodiments.

An operation of the above configuration is described.

An image signal (having, for example, 1280 horizontal pixels, 720 vertical lines, and a frame frequency of 60) input from the input terminal 401 is output to the divider 402. According to this embodiment, the divider 402 divides the input signal into, for example, the first image signal (having, for example, 720 horizontal pixels, 480 vertical lines, and a frame frequency of 60) down-converted by a band limitation filter and having a low-resolution and the second image signal obtained by up-converting the first image signal and subtracting it from the input image signal. The two signals are obtained in this manner, and the first image signal is high-efficiency-encoded by the first encoder 403 and output through the first channel 405 that is a transmission path, while the second image signal is low-efficiency-encoded by the second encoder 404 and output through the second channel 406 that is a transmission path.

As described above, this embodiment transmits the first and second encoded signals through the different channels, thereby enabling broadcasting that is compatible with high-resolution signals and that can be received by viewers having only a conventional decoder.

Embodiment 5

Figure 5:
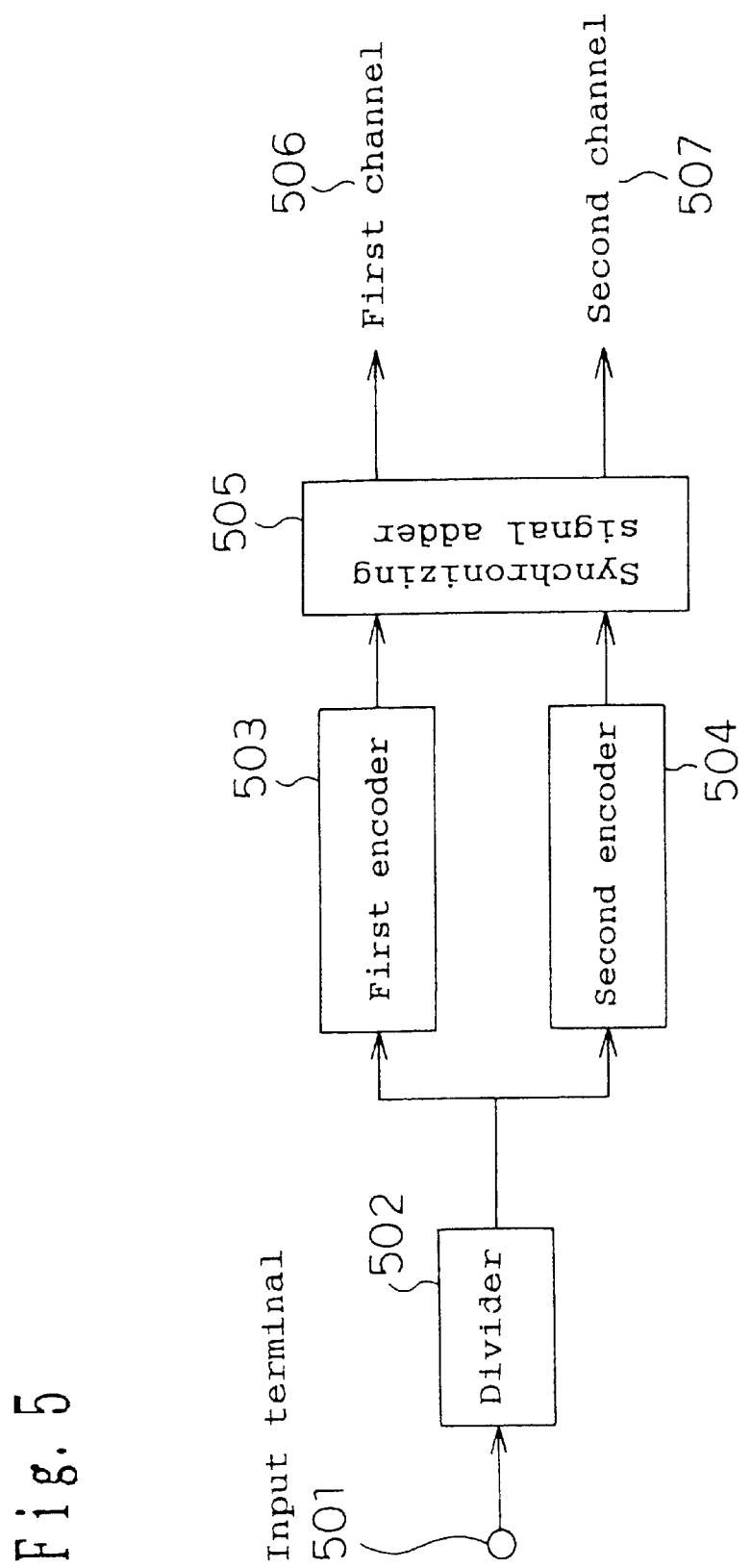
FIG. 5 is a block diagram describing an image-signal transmission apparatus according to a fifth embodiment of this invention.

FIG. 5 describes a fifth embodiment of this invention. Reference numeral 501 designates an input terminal that inputs an image signal; 502 is a divider that divides the input signal into two types of signals; 503 and 504 are a first and a second encoders that high-efficiency-encode the input signals; 505 is a synchronizing-signal adder that adds a synchronizing signal for frame-synchronizing the input signals; and 506 and 507 are a first and a second channels that are transmission paths for transmitting the input signals.

An operation of this configuration is described below.

As in Embodiment 4, an image signal input from the input terminal 501 is divided by the divider 502, high-efficiency-encoded by the first and second encoder 503 and 504, and output to the synchronizing-signal adder 505. The synchronizing signal adder 505 adds a synchronizing signal that enables a decoder to synchronize the outputs from the two encoders 503 and 504 for each frame, and outputs the resulting signals to the first and second channels 506 and 507 that are transmission paths.

As described above, this embodiment not only provides the same effects as the fourth embodiment but also adds the synchronizing signal, thereby simply making both input signals mutually compatible.

Embodiment 6

Figure 6:
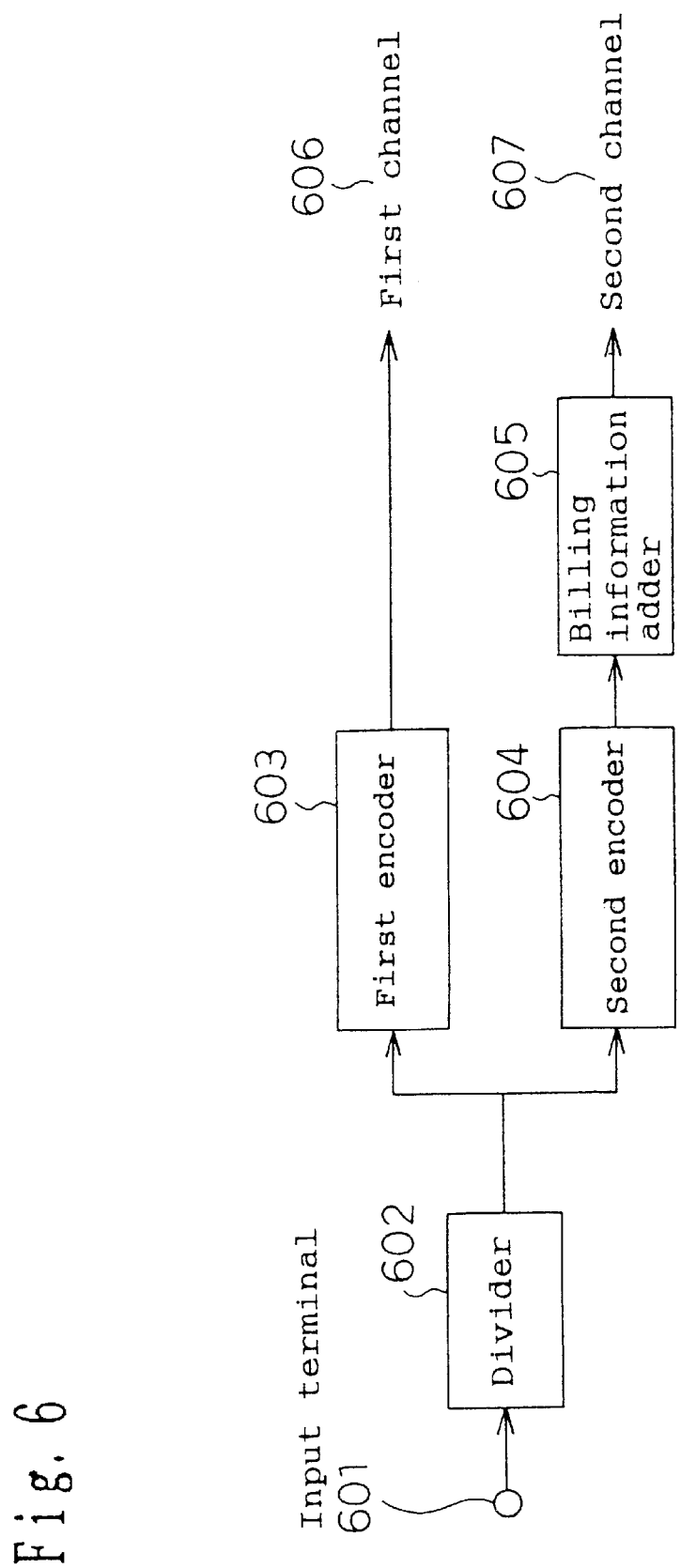
FIG. 6 is a block diagram describing an image-signal transmission apparatus according to a sixth embodiment of this invention.

FIG. 6 describes a sixth embodiment of this invention. Reference numeral 601 designates an input terminal that inputs an image signal; 602 is a divider that divides the input signal into two types of signals; 603 and 604 are a first and a second encoders that high-efficiency-encode the input signals; 605 is a billing information adder that adds billing information to the input signal; and 606 and 607 are a first and a second channels that are transmission paths as a transmission means for transmitting the input signals.

An operation of this configuration is described below.

As in Embodiment 4, an image signal input from the input terminal 601 is divided by the divider 602 and high-efficiency-encoded by the first and second encoders 603 and 604. A first encoded signal output from the first encoder 603 is output to the first channel 606, whereas a second encoded signal output from the second encoder 604 is output to the billing information adder 605. The billing information adder 605 adds billing information to the second encoded signal and outputs it to the second channel 607.

As described above, this embodiment not only provides the same effects as the fourth embodiment but also adds billing information to the output from the second encoder 604, thereby enabling broadcasting such that those viewing conventional broadcasting are not charged whereas those viewing high-resolution broadcasting are charged.

Embodiment 7

Figure 7:
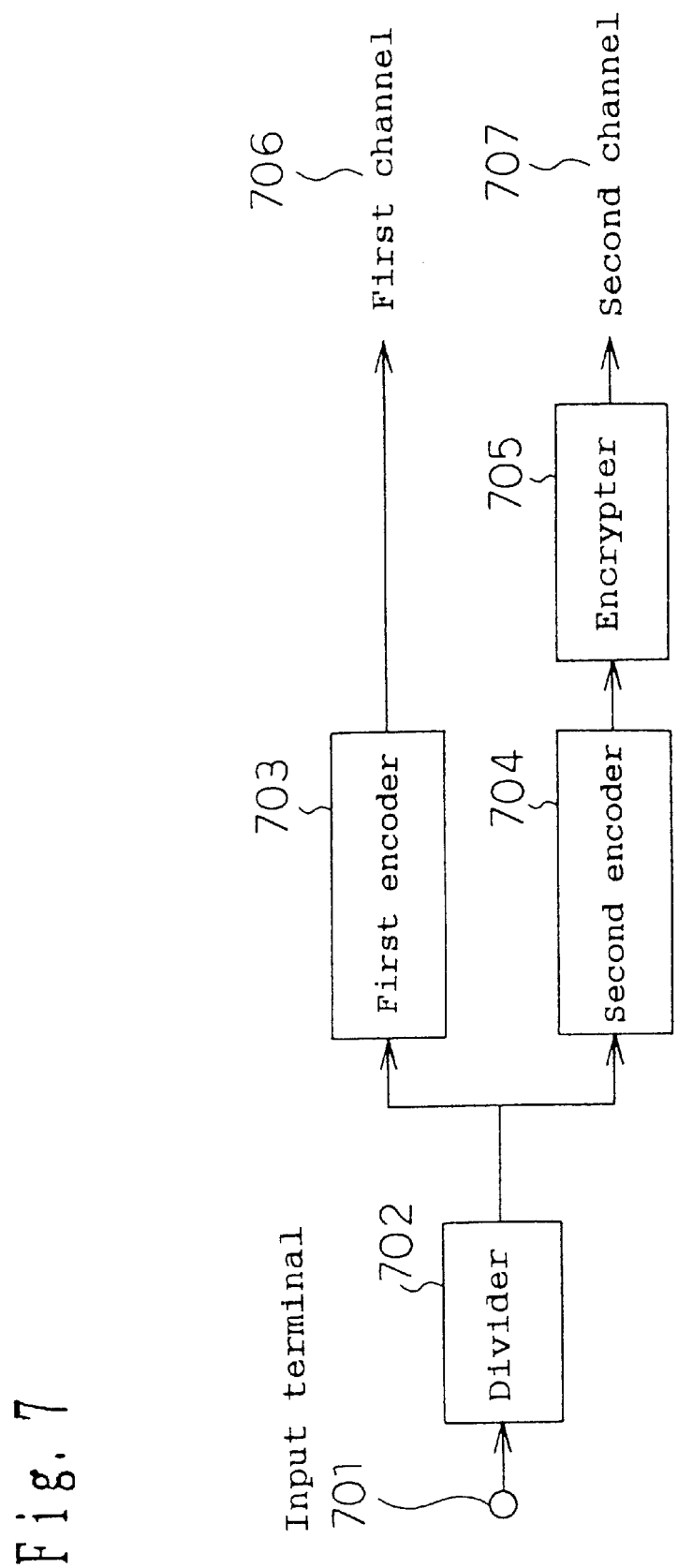
FIG. 7 is a block diagram describing an image-signal transmission apparatus according to a seventh embodiment of this invention.

FIG. 7 describes a seventh embodiment of this invention. Reference numeral 701 designates an input terminal that inputs an image signal; 702 is a divider that divides the input signal into two types of signals; 703 and 704 are a first and a second encoders that high-efficiency-encode the input signals; 705 is an encrypting device that encrypts the input signals; and 706 and 707 are a first and a second channels that are transmission paths for transmitting the input signals.

An operation of this configuration is described below.

As in Embodiment 4, an image signal input from the input terminal 701 is divided by the divider 702 and high-efficiency-encoded by the first and second encoders 703 and 704. A first encoded signal output from the first encoder 703 is output to the first channel 706, whereas a second encoded signal output from the second encoder 704 is output to the encrypting device 705. The encrypting device 705 encrypts the input second encoded signal and outputs it to the second channel 706. There is no problem if this encryption involves compression, and in this case, the compression rate is improved to reduce the compression rate required for the second encoded signal at the second encoder 704.

As described above, this embodiment not only provides the same effects as the fourth embodiment but also enables the second encoder 704 to encrypt and transmit data, thereby improving the compression rate required for the second encoded signal.

Embodiment 8

Figure 8:
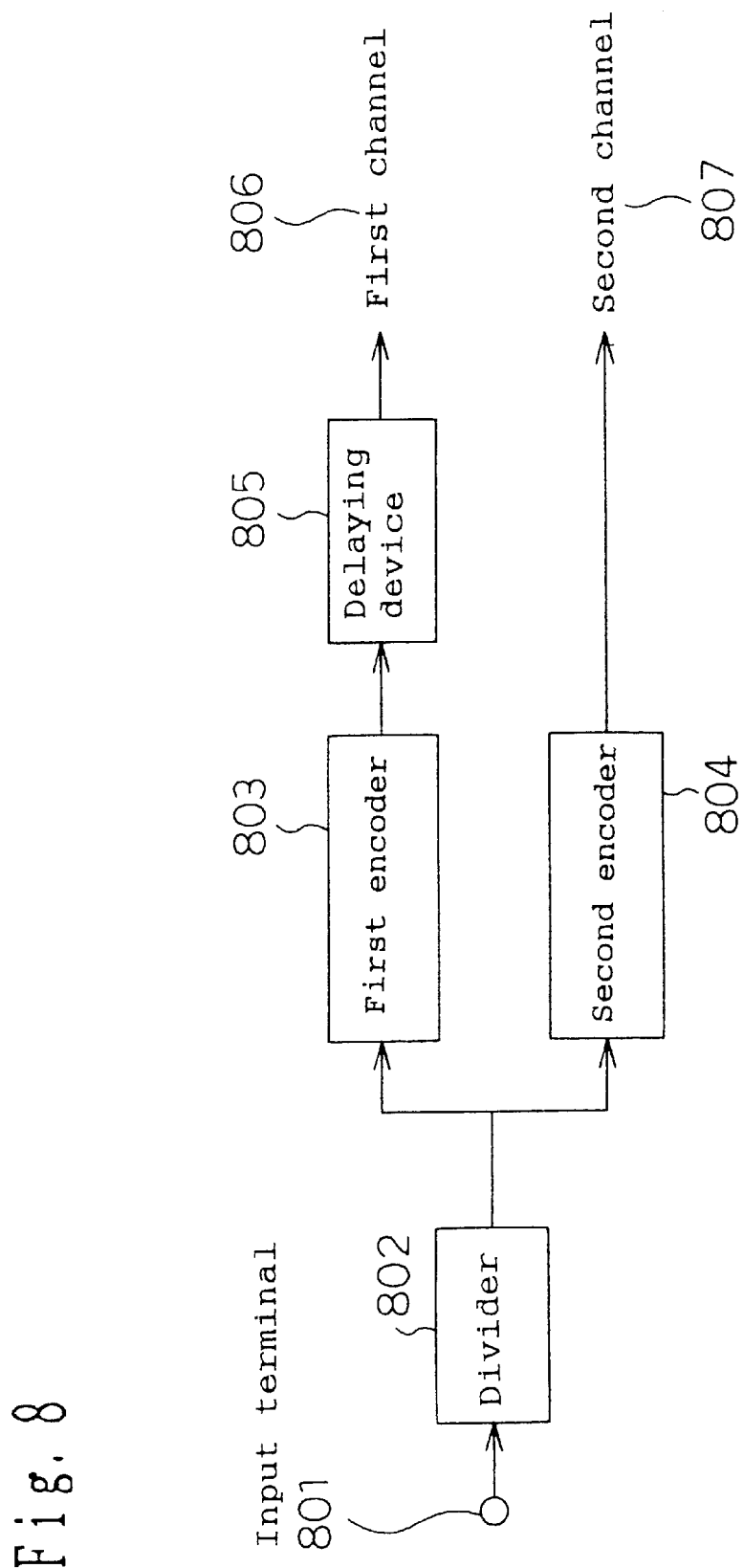
FIG. 8 is a block diagram describing an image-signal transmission apparatus according to an eighth embodiment of this invention.

FIG. 8 describes an eighth embodiment of this invention. Reference numeral 801 designates an input terminal that inputs an image signal; 802 is a divider that divides the input signal into two types of signals; 803 and 804 are a first and a second encoders that high-efficiency-encode the input signals; 805 is a delaying device for delaying the input signal; and 806 and 807 are a first and a second channels that are transmission paths for transmitting the input signals.

An operation of this configuration is described below.

As in Embodiment 4, an image signal input from the input terminal 801 is divided by the divider 802 and high-efficiency-encoded by the first and second encoders 803 and 804. A first encoded signal output from the first encoder 803 is output to the delaying device 805, whereas a second encoded signal output from the second encoder 804 is output to the second channel 807. The delaying device 805 delays the input signal by a predetermined period of time before outputting it to the first channel 806.

As described above, this embodiment not only provides the same effects as the fourth embodiment but also enables data from the second encoder 804 requiring a large amount of time for decoding to be transmitted first, thereby reducing the amount of delay required compared to the decoding of signals in a low-resolution mode, even if signals in a high-resolution mode are decoded.

Embodiment 9

Figure 9:
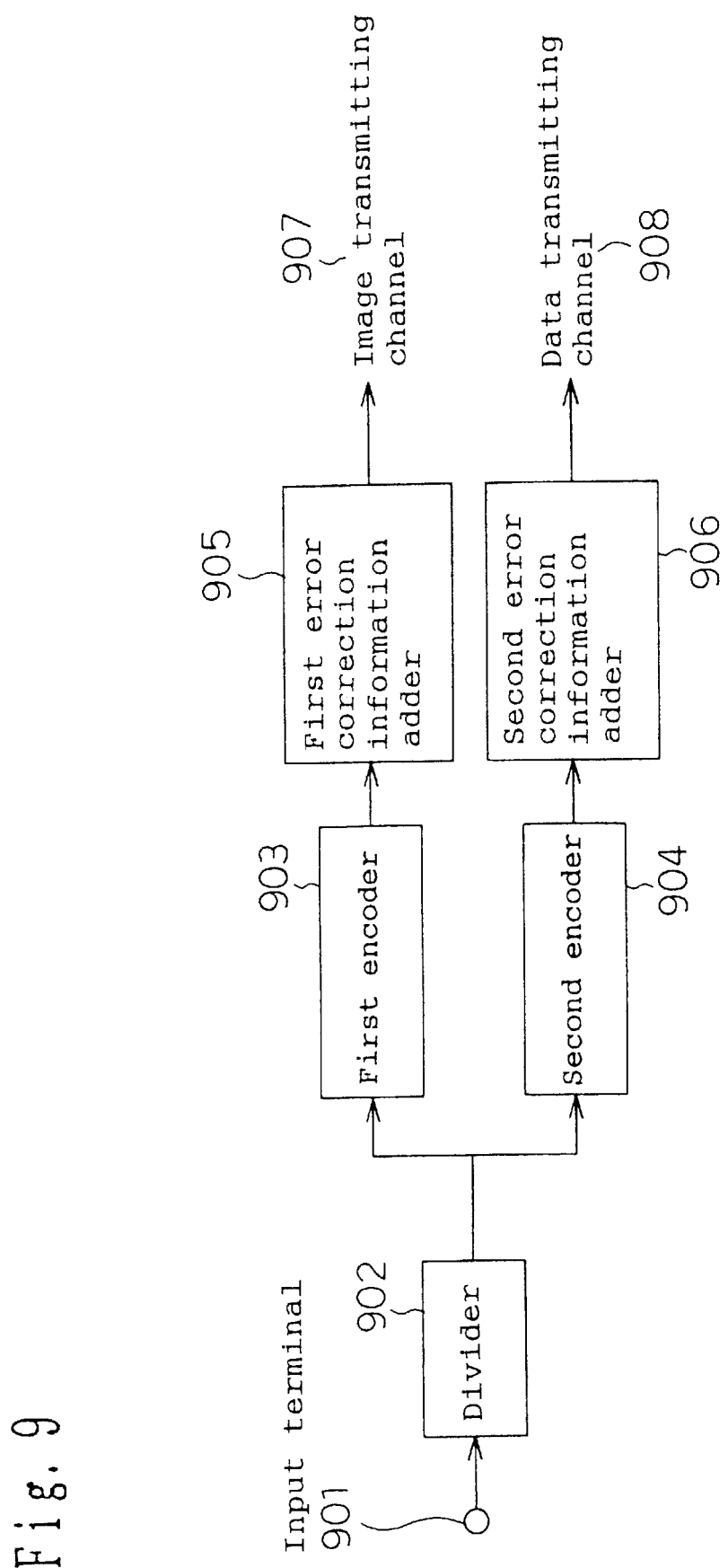
FIG. 9 is a block diagram describing an image-signal transmission apparatus according to a ninth embodiment of this invention.

FIG. 9 describes a ninth embodiment of this invention. Reference numeral 901 designates an input terminal that inputs an image signal; 902 is a divider that divides the input signal into two types of signals; 903 and 904 are a first and a second encoders that low-efficiency-encode the input signals; 905 and 906 are a first and a second error correction information adders that add error correction information to the input signals; 907 is an image transmission channel that transmits an image signal; and 908 is a data transmission channel that transmits data.

An operation of this configuration is described.

As in Embodiment 4, an image signal input from the input terminal 901 is divided by the divider 902 and low-efficiency-encoded by the first and second encoders 903 and 904. A first encoded signal output from the first encoder 903 is output to the first error correction information adder 905, whereas a second encoded signal output from the second encoder 904 is output to the second error correction information adder 906. The first error correction information adder 905 adds error correction information to the signal for image transmission and outputs the resulting signal to the image transmission channel 907. The second error correction information adder 906 adds to the signal a smaller amount of error correction information than in the addition of error correction information to data for normal transmission, and outputs the resulting signal to the data transmission channel 908. This is because even if the data from the second encoder 904 cannot be decoded due to an error, only the data from the first encoder 903 can be used to display a screen and because the amount of error correction information for normal data is larger than that for image signals.

As described above, this embodiment not only provides the same effects as the fourth embodiment but also enables the amount of error correction information to be reduced even if the data transmission channel is used to transmit the second encoded signal, thereby improving the efficiency in encoding the second image signal.

Embodiment 10

Figure 10:
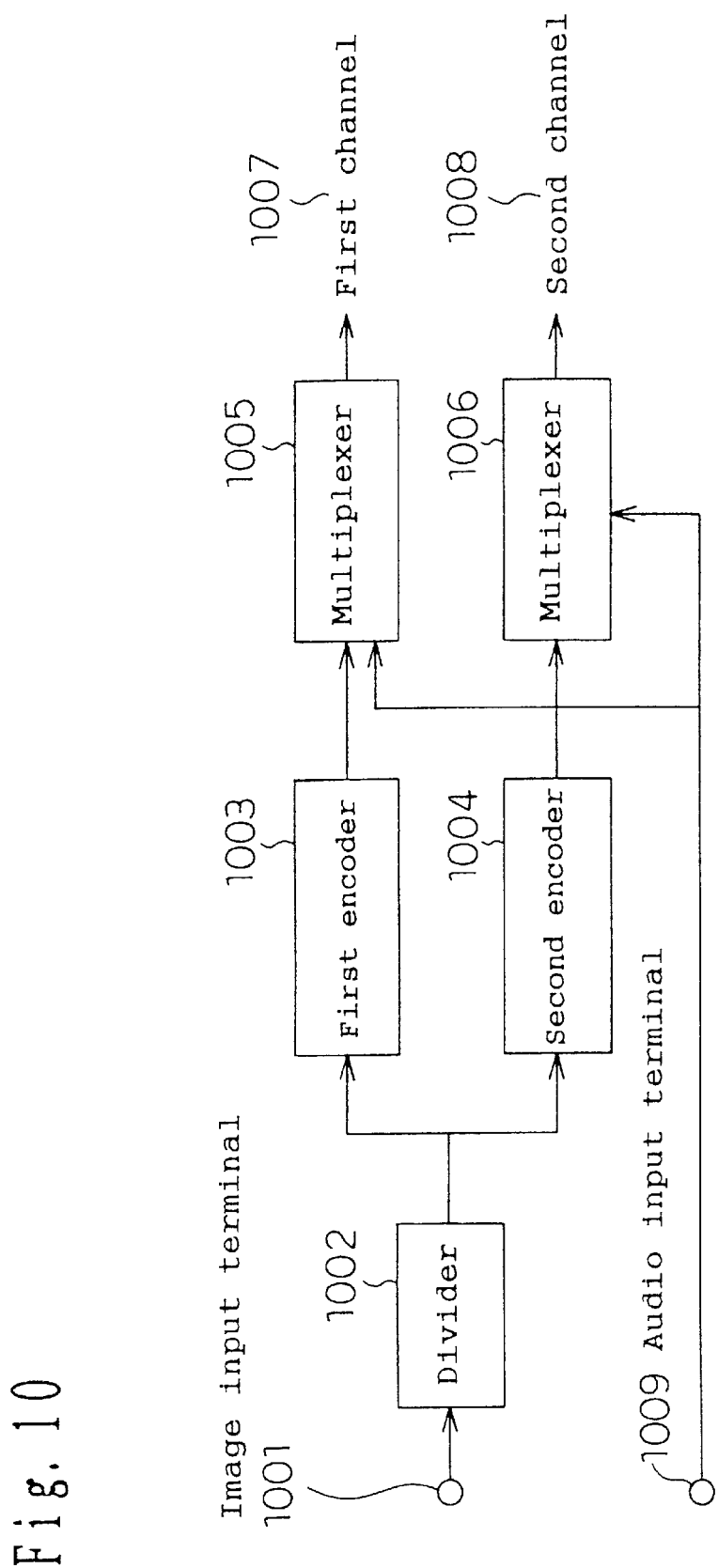
FIG. 10 is a block diagram describing an image-signal transmission apparatus according to a tenth embodiment of this invention.

FIG. 10 describes a tenth embodiment of this invention. Reference numeral 1001 designates an image input terminal that inputs an image signal; 1002 is a divider that divides the input signal into two types of signals; 1003 and 1004 are a first and a second encoders that low-efficiency-encode the input signals; 1005 and 1006 are multiplexers that multiplex the two input signals; 1007 and 1008 are a first and a second channels that transmit the input signals; and 1009 is an audio input terminal that inputs an audio signal.

An operation of this configuration is described.

As in Embodiment 4, an image signal input from the image input terminal 1001 is divided by the divider 1002, low-efficiency-encoded by the first and second encoders 1003 and 1004, and output to the multiplexers 1005 and 1006 as a first and a second encoded signals, respectively. The multiplexers 1005 and 1006 multiplex image signals low-efficiency-encoded and output by the first and second encoders 1003 and 1004 and an audio signal that is input through the audio input terminal 1009 and that is frame-synchronized with the low-efficiency-encoded image signals, and then outputs the resulting signals to the first and second channels 1007 and 1008, respectively.

As described above, this embodiment not only provides the same effects as the fourth embodiment but also transmits sound through both channels, thereby enabling only the sound to be provided even if the image cannot be playbackd due to an error in the first encoded signal.

Embodiment 11

Figure 11:
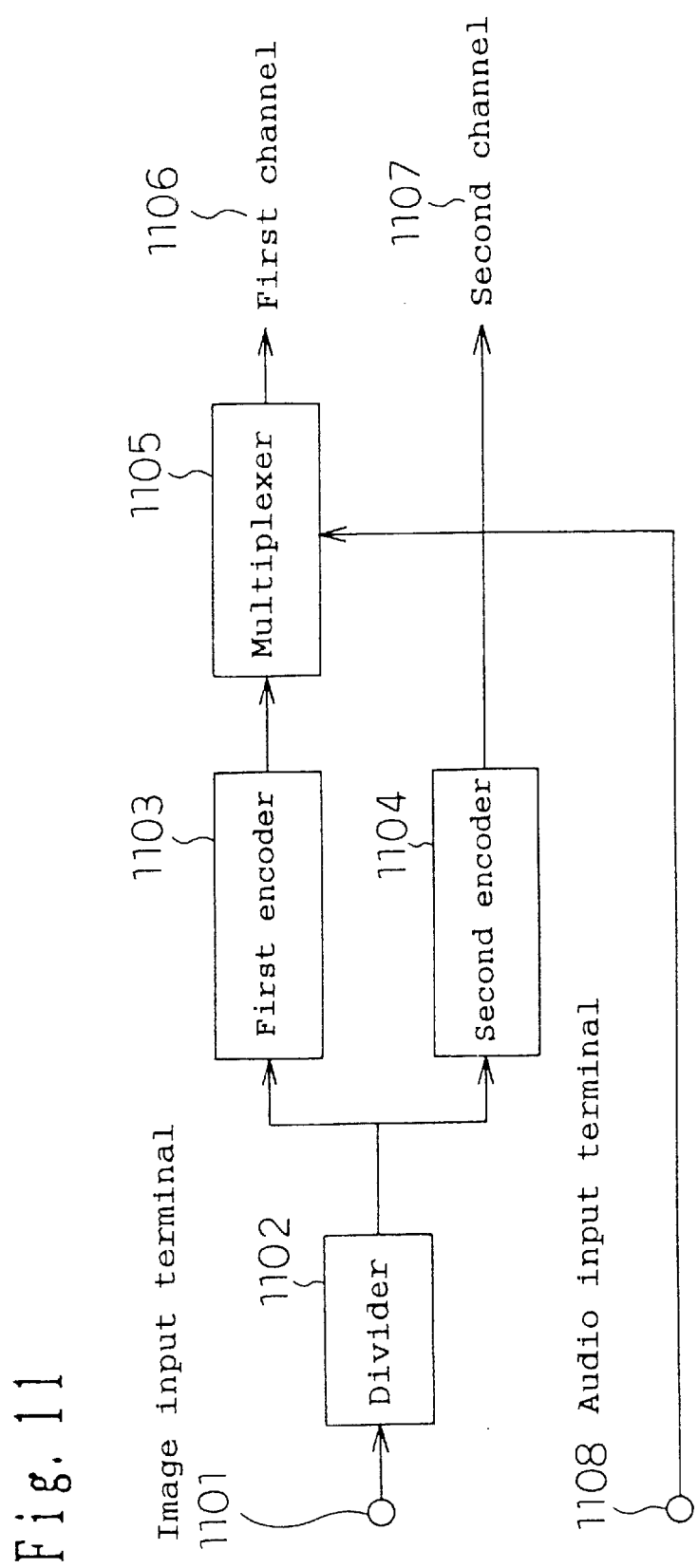
FIG. 11 is a block diagram describing an image-signal transmission apparatus according to an eleventh embodiment of this invention.

FIG. 11 describes an eleventh embodiment of this invention. Reference numeral 1101 designates an image input terminal that inputs an image signal; 1102 is a divider that divides the input signal into two types of signals; 1103 and 1104 are a first and a second encoders that low-efficiency-encode the input signals; 1105 is a multiplexer that multiplexes the two input signals; 1106 and 1107 are a first and a second channels that transmit the input signals; and 1108 is an audio input terminal that inputs an audio signal.

An operation of this configuration is described.

As in Embodiment 4, an image signal input from the image input terminal 1101 is divided by the divider 1102, low-efficiency-encoded by the first and second encoders 1103 and 1104, and output to the multiplexer 1105 and the second channel 1107 as a transmission path. The multiplexer 1105 multiplexes an image signal that is the first encoded signal low-efficiency-encoded and output by the first encoder 1103 and an audio signal that is input through the audio input terminal 1108 and that is frame-synchronized with the low-efficiency-encoded image signal, and then outputs the resulting signal to the first channel 1106 that is a transmission path.

As described above, this embodiment not only provides the same effects as the fourth embodiment but also transmits the audio signal only through the first channel 1106, thereby improving the efficiency in encoding the second encoded signal transmitted over the second channel 1107.

Embodiment 12

Figure 12:
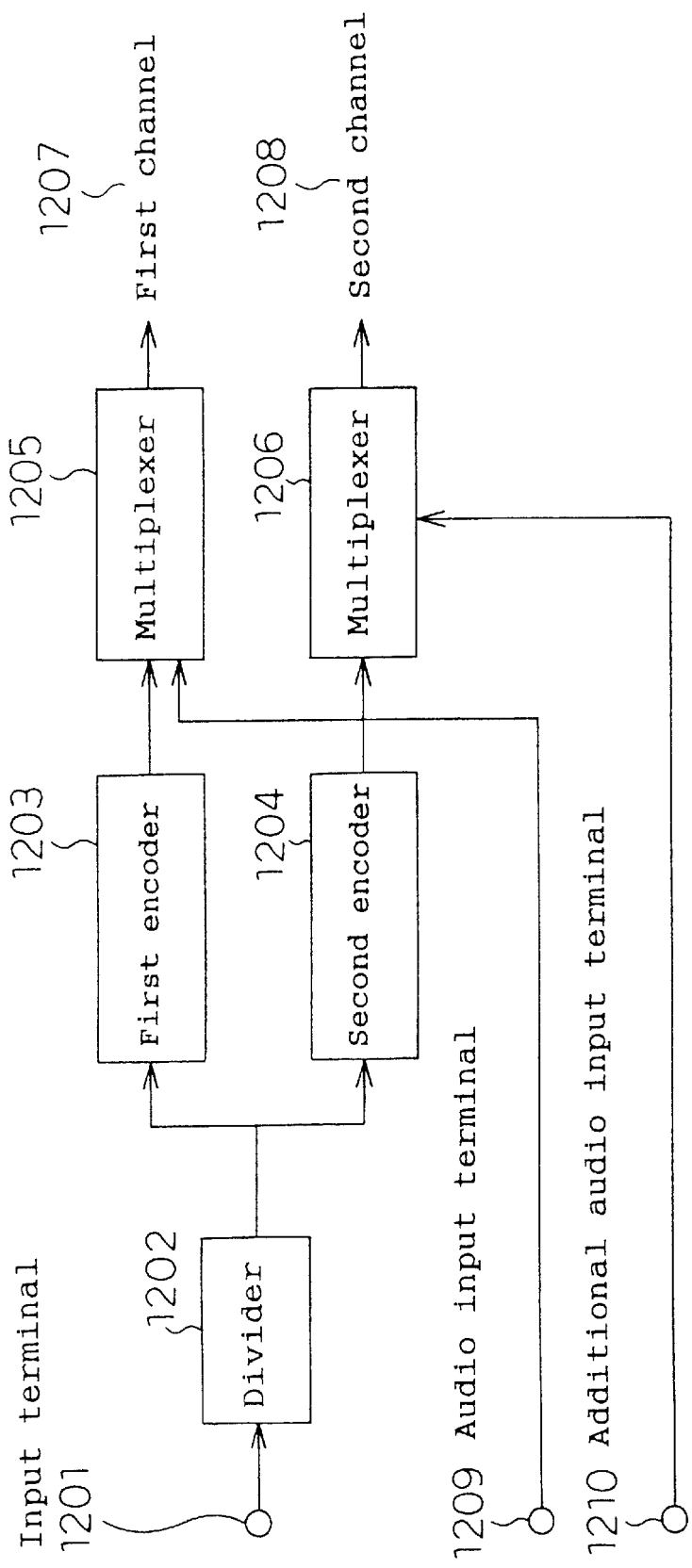
FIG. 12 is a block diagram describing an image-signal transmission apparatus according to a twelfth embodiment of this invention.

FIG. 12 describes a twelfth embodiment of this invention. Reference numeral 1201 designates an image input terminal that inputs an image signal; 1202 is a divider that divides the input signal into two types of signals; 1203 and 1204 are a first and a second encoders that low-efficiency-encode the input signals; 1205 and 1206 are multiplexers that multiplex the two input signals; 1207 and 1208 are a first and a second channels that transmit the input signals; 1209 is an audio input terminal that inputs an audio signal; and 1210 is an additional audio input terminal that inputs an additional audio signal relating to the audio signal. The additional audio signal is, for example, sound information or a sound effect.

An operation of this configuration is described.

As in Embodiment 4, an image signal input from the image input terminal 1201 is divided by the divider 1202, low-efficiency-encoded by the first and second encoders 1203 and 1204, and output to the multiplexers 1205 and 1206. The multiplexer 1205 multiplexes the output from the first encoder 1203 and the audio signal that is input through the audio input terminal 1209 and that is frame-synchronized with the low-efficiency-encoded image signal, whereas the multiplexer 1206 multiplexes the output from the second encoder 1204 and the additional audio signal that is input through the additional audio input terminal 1210 and that is frame-synchronized with the low-efficiency-encoded image signal. The multiplexers output the resultant signals to the first and second channels 1207 and 1208 that are transmission paths.

As described above, this embodiment not only provides the same effects as the fourth embodiment but also transmits the additional audio signal through the second channel 1208, so only those viewers in a high-resolution mode who can receive signals through the second channel 1208 can obtain acoustic effects through the additional audio information such as surround.

Embodiment 13

Figure 13:
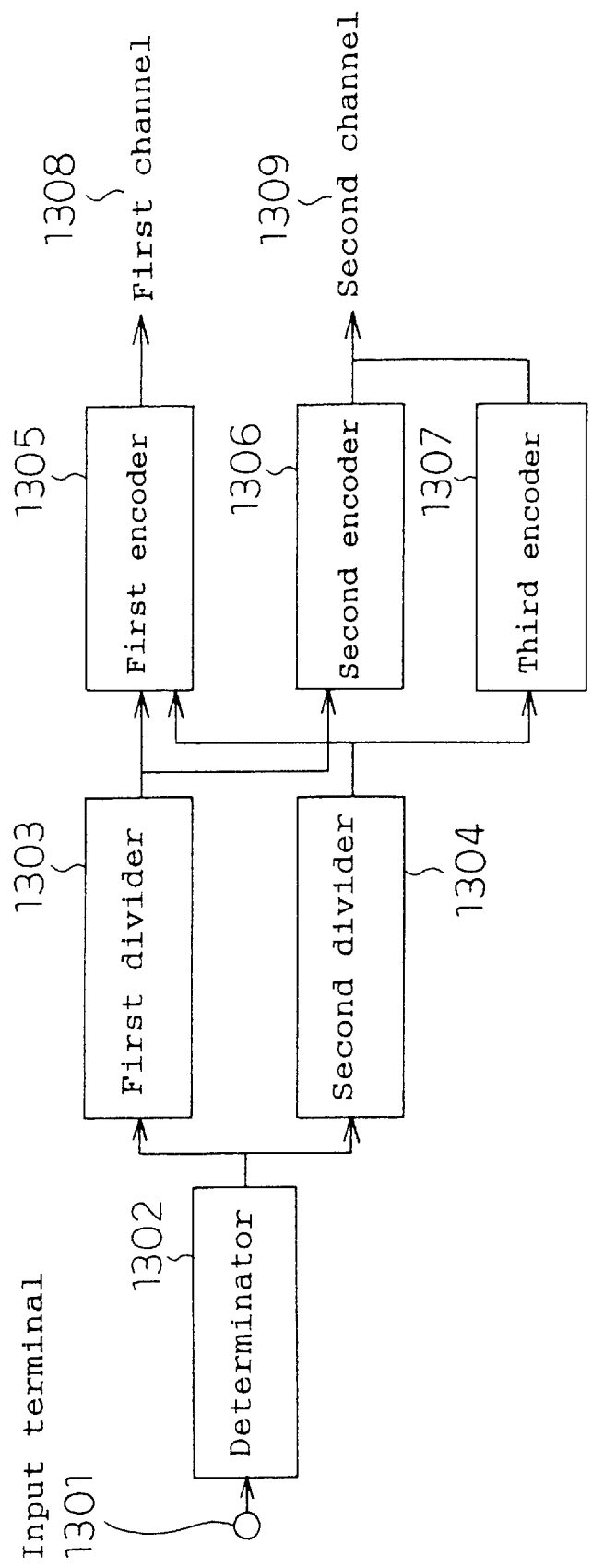
FIG. 13 is a block diagram describing an image-signal transmission apparatus according to a thirteenth embodiment of this invention.

FIG. 13 describes a thirteenth embodiment of this invention. Reference numeral 1301 designates an input terminal that inputs an image signal; 1302 is a determinator that determines the resolution of the input signal; 1303 and 1304 are a first and a second dividers that divide the input signal into two types of signals; 1305, 1306, and 1307 are a first, a second, and a third encoders that low-efficiency-encode the input signals; and 1308 and 1309 are a first and a second channels that transmit the input signals.

An operation of this configuration is described.

An image signal input from the input terminal 1301 is input to the determinator 1302. The determinator 1302 determines whether the resolution of the input image signal is high or low. If high, the determinator transmits the input image signal to the first divider 1303 and otherwise transmits it to the second divider 1304.

If the resolution of the input signal is high, as in embodiment 4, the first divider 1303 divides the data and sends the divided data to the first and second encoders 1305 and 1306, which then low-efficiency-encode the data and output them to the first and second channels 1308 and 1309. On the other hand, if the resolution of the input signal is low, the second divider 1304 divides the input image signal into, for example, a first image signal having a certain bandwidth and a second image signal that is the differential between the input image signal and the first image signal, and outputs the first image signal to the first encoder 1305 and the second image signal to the third encoder 1307. The encoders 1305 and 1307 then low-efficiency-encode the data and output them to the first and second channels 1308 and 1309. Alternatively, the second divider 1304 may divide the input image signal into a first image signal having a certain bandwidth and a second image signal that is the differential between the input image signal and the first image signal that has been encoded/decoded.

As described above, this embodiment not only provides the same effects as the fourth embodiment but also enables high-image-quality service to be provided to viewers having a decoder compatible with high-resolution signals if the broadcasting source has a low resolution.

While, in the embodiment, the second encoder is configured separately from the third encoder, they may be configured together.

Embodiment 14

Figure 14:
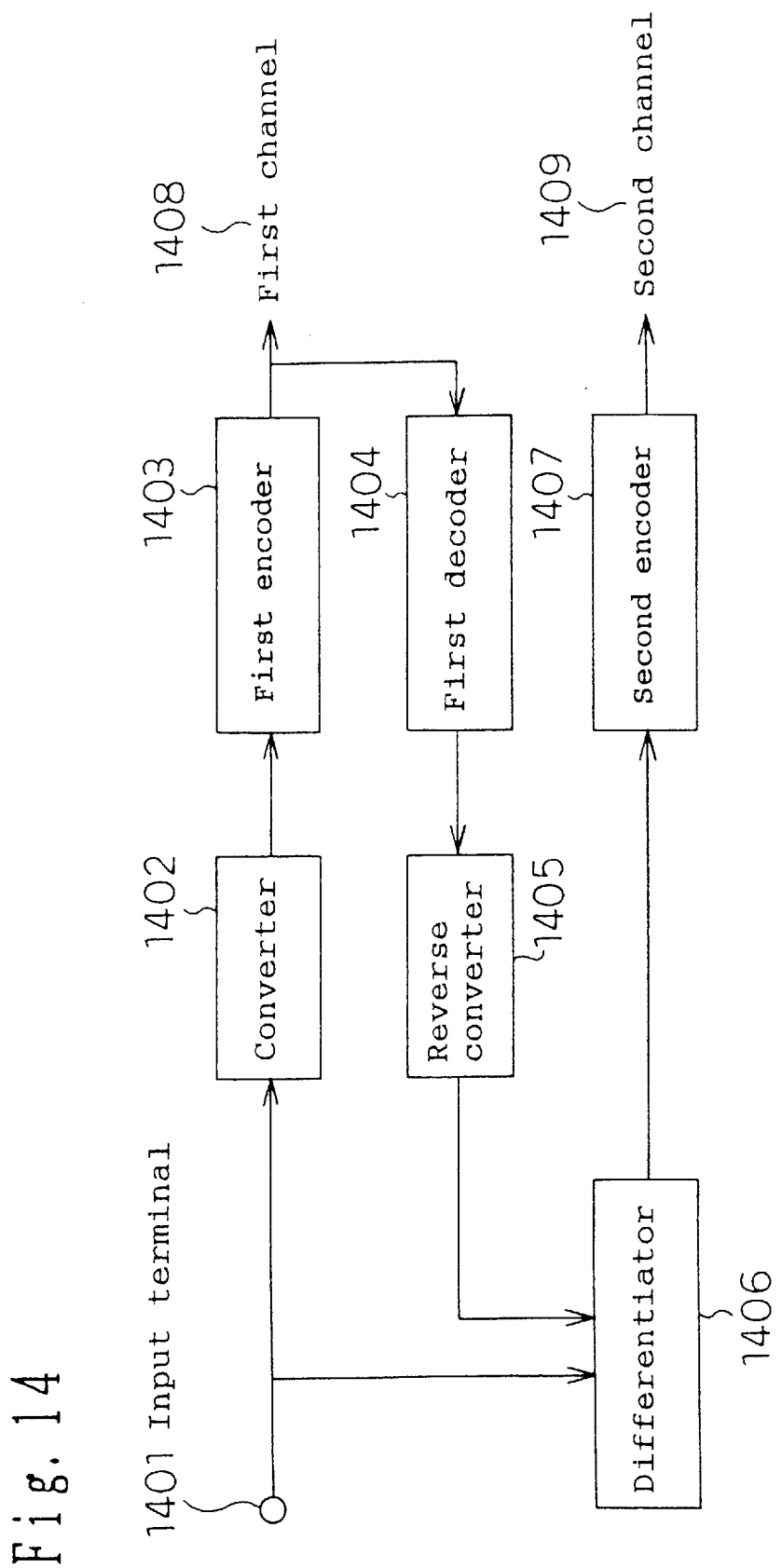
FIG. 14 is a block diagram describing an image-signal transmission apparatus according to a fourteenth embodiment of this invention.

FIG. 14 describes a fourteenth embodiment of this invention. Reference numeral 1401 designates an input terminal that inputs an image signal; 1402 is a converter that limits the band of the input signal to convert its resolution and number of pixels; 1403 and 1407 are a first and a second encoders that low-efficiency-encode the input signals; 1404 is a first decoder that decodes the output from the first encoder 1403; 1405 is a reverse converter that provides an effect reverse to that of the converter 1402; 1406 is a differentiator as a differential-image generating means for determining the differential between the two input signals; and 1408 and 1409 are a first and a second channels that transmit the input signals. The converter 1402 and the first encoder 1403 constitute a converting and encoding means, while the reverse converter 1405 and the first decoder 1404 constitute a reverse converting and decoding means.

An operation of this configuration is described.

An image signal input from the input terminal 1401 is input to the converter 1402. The converter 1402 limits the band of the input image signal to convert its resolution and number of pixels and then outputs the signal obtained to the first encoder 1403. The first encoder 1403 low-efficiency-encodes the input signal and outputs it to the first channel 1408 and the first decoder 1404. The first decoder 1404 decodes the input signal and outputs it to the reverse converter 1405, which then executes conversion reverse to that by the converter 1402 and outputs the signal obtained to the differentiator 1406. The differentiator 1406 determines the differential between the input image signal and reversely converted signal corresponding to the same frame and outputs the result to the second encoder 1407. The second encoder 1407 low-efficiency-encodes the input signal and outputs it to the second channel 1409.

As described above, this embodiment not only provides the same effects as the fourth embodiment but can also low-efficiency-encode components corresponding to high-resolution signals more efficiently than the fourth embodiment, thereby improving the image quality for a high resolution.

Embodiment 15

Figure 15:
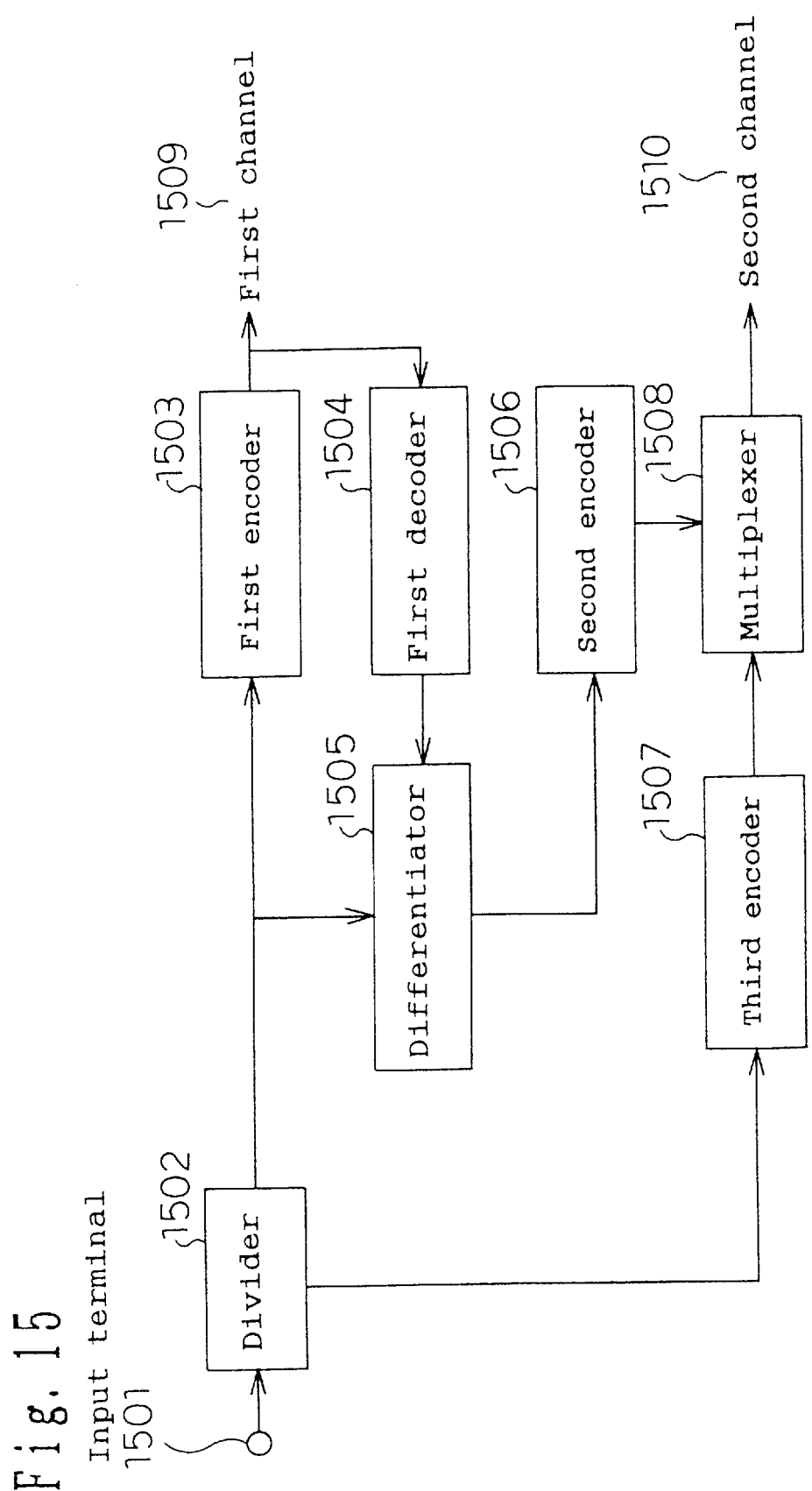
FIG. 15 is a block diagram describing an image-signal transmission apparatus according to a fifteenth embodiment of this invention.

FIG. 15 describes a fifteenth embodiment of this invention. Reference numeral 1501 designates an input terminal that inputs an image signal; 1502 is a divider that divides the input signal; 1503, 1506, and 1507 are a first, a second, and a third encoders that low-efficiency-encode the input signals; 1504 is a first decoder that decodes the input signal; 1505 is a differentiator that determines the differential between the two input signals; 1508 is a multiplexer that multiplexes the two input signals; and 1509 and 1510 are a first and a second channels that transmit the input signals. The first decoder 1504 and the differentiator 1505 constitute the differential generating means.

An operation of this configuration is described below.

An image signal input through the input terminal 1501 is output to the divider 1502, which then divides the signal as in the fourth embodiment and outputs it to the first encoder 1503, the differentiator 1505, and the third encoder 1507. The data input to the first encoder 1503 is low-efficiency-encoded and output to the first channel 1509 that is a transmission path and to the first decoder 1504. The first decoder 1504 decodes the input data and outputs it to the differentiator 1505, which then determines the differential between the data after division and the decoded data corresponding to the same frame and outputs the result to the second encoder 1506. The second encoder .1506 low-efficiency-encodes the input data and outputs it to the multiplexer 1508. The third encoder 1507 low-efficiency-encodes the input data and outputs it to the multiplexer 1508. The multiplexer 1508 multiplexes data in the two input signals corresponding to the same frame and outputs the resulting data to the second channel 1510.

As described above, this embodiment enables the second channel 1510 to transmit a signal that can improve the image quality of a low-resolution signal and/or a signal that increases the resolution of a low-resolution signal as in the fourth embodiment. Thus, this embodiment not only provides the effects of the fourth embodiment but also enables viewers having a decoder compatible with high-resolution signals to view low-resolution signals with their image quality improved even if the broadcasting source provides only low-resolution signals. In addition, by improving the image quality of low-resolution signals, this embodiment can also improve the image quality of high-resolution signals.

In the fourth to fifteenth embodiments, the input image signal and low-resolution signal are arbitrary and the method used by each divider to divide the input image signal is also arbitrary. Furthermore, the low-efficiency-encoding method used by each encoder is arbitrary, the low-efficiency-encoding method may significantly vary among the encoders, and the transmission path is not particularly defined.

In addition, as for transmission path the first channel may comprise a channel that is used in conventional broadcasting and that transmits images and/or sounds, and the second channel may comprises a channel that is currently used to transmit data. Of course, these embodiments can be realized using a configuration other than those shown above.

Embodiment 16

A sixteenth embodiment of this invention is described below.

Standards for a 420p signal that is a progressive scanning signal include SMPTE294M that is a transmission standard and MPEG that is a compression standard. These two standards do not deal with exactly the same 420p signal but involve the different sample positions of a color difference signal relative to a luminance signal for transmission. Thus, the image-signal transmission method according to the sixteenth embodiment multiplexes together a progressive scanning signal and a signal (information) indicating the sample position of a color difference signal relative to a luminance signal for transmission. In low-efficiency-encoding a transmitted signal, this embodiment can appropriately convert a color difference signal based on color difference information to avoid the unwanted degradation of the color difference signal and to enable a plurality of image signals to be transmitted over the same transmission path.

The position at which the signal indicating the sample position of the color difference signal is to be recorded is arbitrary, and this embodiment is also applicable to signals conforming to standards different from those described above and the number of standards dealt with is arbitrary.

Embodiment 17

Figure 16:
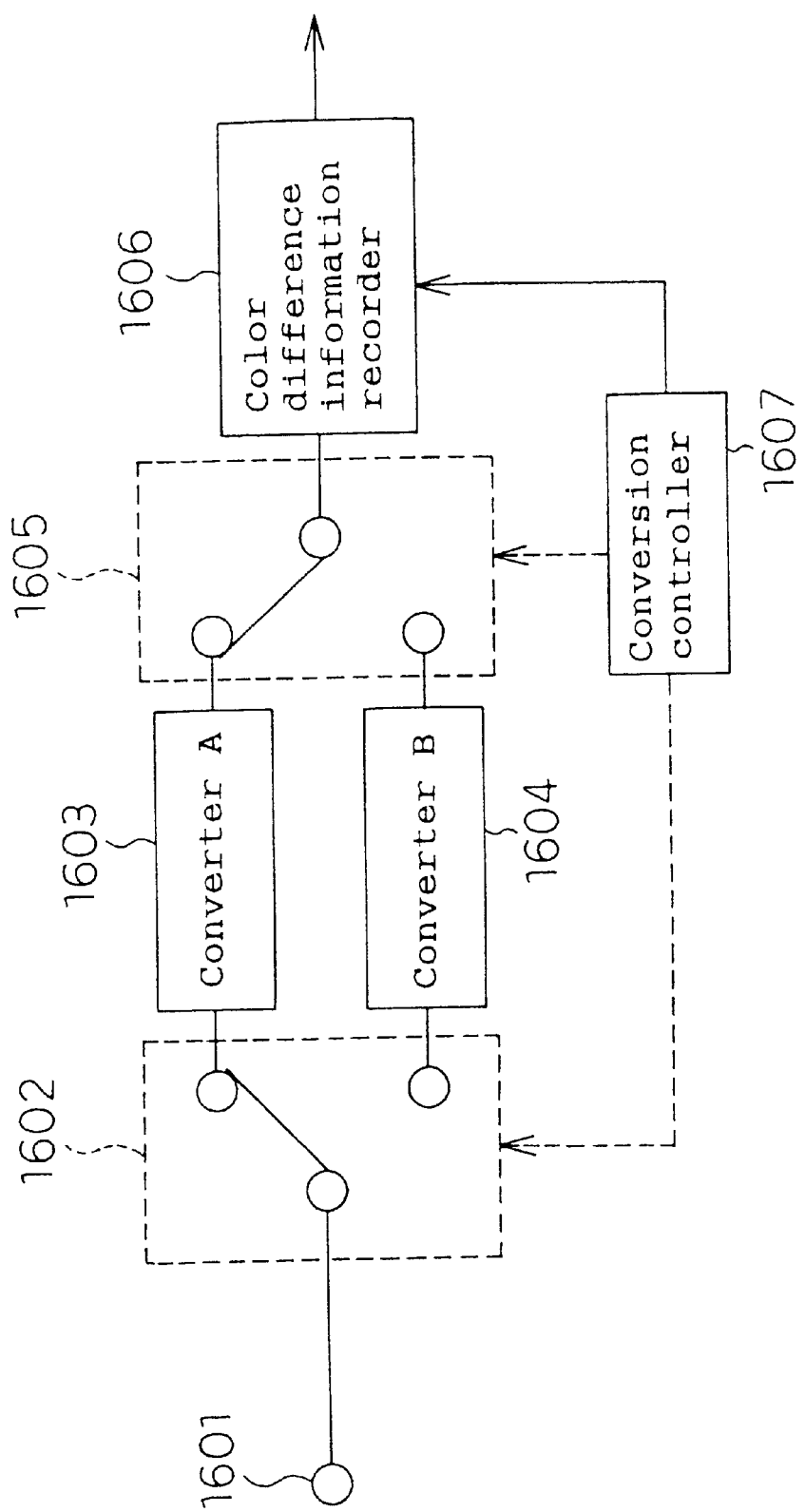
FIG. 16 is a block diagram describing an image-signal transmission apparatus according to a seventeenth embodiment of this invention.

FIG. 16 is a block diagram of an image signal transmission apparatus according to a seventeenth embodiment of this invention. Reference numeral 1601 designates an input terminal that inputs an 844 signal that is a progressive scanning signal; 1602 and 1605 are switches that are switched depending on a control signal; 1603 is a converter A that applies down-conversion for the characteristics of SMPTE294M to a color difference signal in the input signal; 1604 is a converter B that applies down-conversion for the characteristics of MPEG to the color difference signal in the input signal; 1607 is a conversion controller that outputs a control signal for switching between the switches 1602 and 1605 to select the converter A1603 or B1604 and that outputs information on the sample position of the color difference signal (hereafter referred to as "color difference information") obtained by the selected converter A1603 or B1604; and 1606 is a color difference information recorder (a multiplexing means) that records the color difference information on the input signal. The converters A1603 and B1604, the switches 1602 and 1605, and the conversion controller 1607 constitute a conversion means.

An operation of an image signal transmission apparatus of this configuration is described.

An 844 signal that is a progressive scanning signal is input through the input terminal 1601. The conversion controller 1607 outputs to the switches 1602 and 1605 a control signal for selecting the converter A1603 or the converter B1604 in order to convert the 844 signal in such a way that a color difference signal becomes a 420p signal with a desired sample position. The switches 1602 and 1605 are switched so that the converter A1603 is selected if a SMPTE294M-standard-conforming signal is desired as the 420p signal and so that the converter B1604 is selected if a MPEG-standard-conforming signal is desired as the 420p signal. Furthermore, the conversion controller 1607 outputs to the color difference information recorder 1606, color difference information on the sample position of the color difference signal obtained by the selected converter A1603 or B1604. The color difference information recorder 1606 multiplexes the converted signal and the color difference information together for output.

As described above, this embodiment allows the color difference information recorder 1606 to record the color difference information from the conversion controller 1607 in order to enable a plurality of types of signals to be transmitted over the same transmission path. In addition, to low-efficiency-encode the transmitted signal, this embodiment can appropriately convert the color difference signal based on the color difference information to avoid the unwanted degradation of the color difference signal.

The position at which the color difference information is to be recorded is arbitrary, this embodiment is also applicable to signals conforming to standards different from those described above, and the number of standards dealt with is arbitrary. If there is a 420p signal conforming to a different standard, a converter compatible with this signal is required so the number of converters or the converters themselves must be changed.

In addition, the converter A1603 converts an input 844 signal into an SMPTE294M-standard-conforming 420p signal and in this case, must convert only the number of samples, while the converter B1604 converts an input 844 signal into an MPEG-standard-conforming 420p signal and in this case, must convert both the number of samples and the phase. This also applies to the converters A and B in the following embodiments.

Embodiment 18

Figure 17:
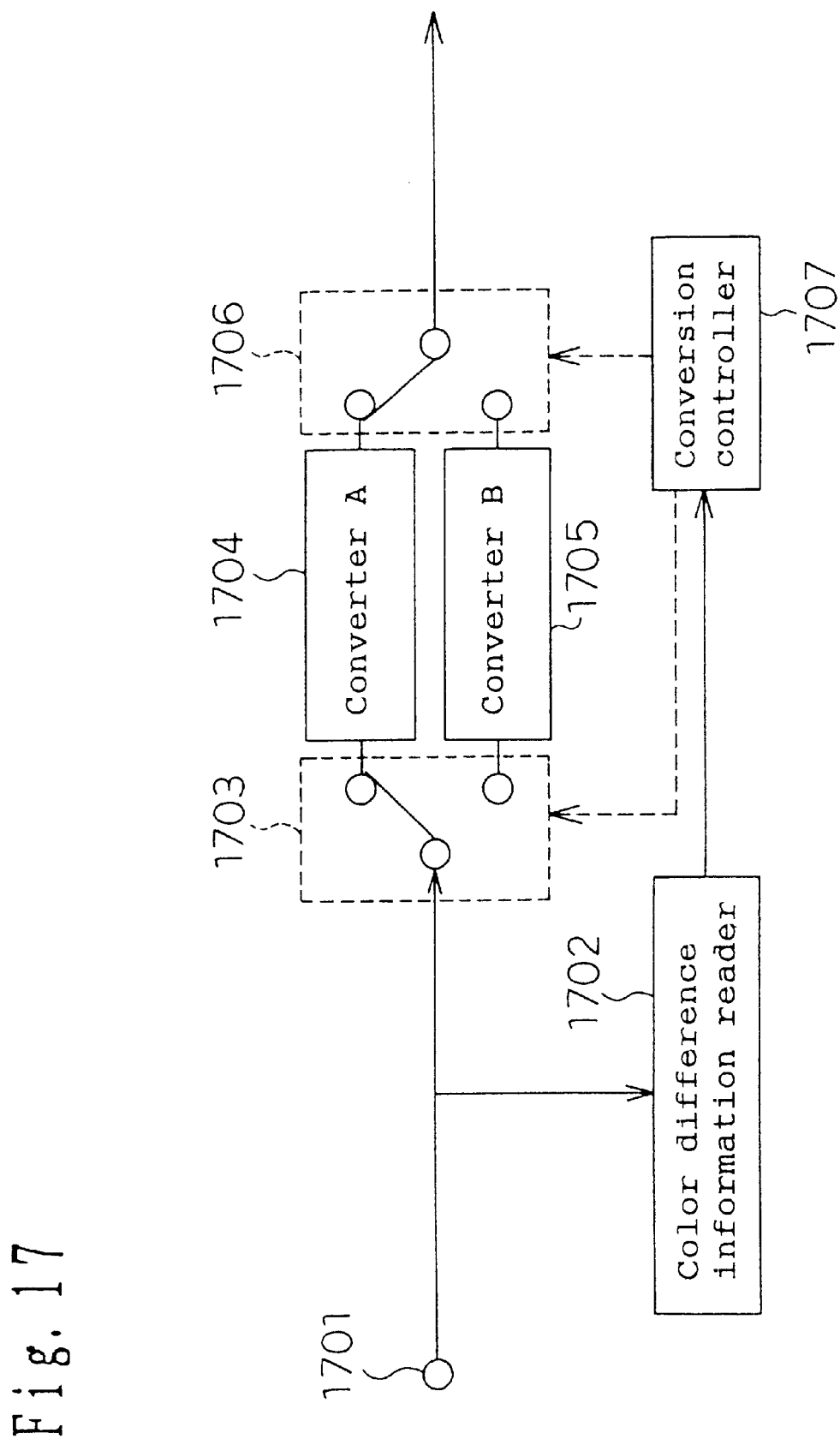
FIG. 17 is a block diagram describing an image-signal transmission apparatus according to an eighteenth embodiment of this invention.

FIG. 17 is a block diagram of an image signal transmission apparatus according to an eighteenth embodiment of this invention. Reference numeral 1701 designates an input terminal that inputs a 420p signal; 1702 is a color difference information reader (a color difference information reading means) that reads from the input signal, color difference information indicating the sample position of a color difference signal; 1703 and 1706 are switches that are switched depending on a control signal; 1704 is a converter A that applies up-conversion for the characteristics of SMPTE294M to the color difference signal in the input signal; 1705 is a converter B that applies up-conversion for the characteristics of MPEG to a color difference signal in the input signal; and 1707 is a conversion controller that outputs a control signal for switching between the switches 1703 and 1706 to select the converter A1704 or B1705 based on the color difference information input from the color difference information reader 1702. The converters A1704 and B1705, the switches 1703 and 1706, and the conversion controller 1707 constitute a conversion means.

An operation of an image signal transmission apparatus of this configuration is described.

A 420p signal that is a progressive scanning signal is input through the input terminal 1701. The 420p signal includes multiplexed color difference information on the sample position of a color difference signal. The color difference information reader 1702 reads the color difference information and outputs it to the conversion controller 1707. Based on the color difference information from the color difference information reader 1702, the conversion controller 1707 outputs a control signal to the switches 1703 and 1706 to switch between the converters A1704 and B1705 to up-convert the color difference signal in such a way as to convert the 420p signal into an 844 signal. That is, the conversion controller 1707 uses the control signal to switch between the switches 1703 and 1706 in order to select the converter A1704 if the 420p signal input to the input terminal 1701 conforms to the SMPTE294M standard while selecting the converter B1705 if the 420p signal conforms to the MPEG standard.

As described above, this embodiment allows the conversion controller 1707 and the switches 1703 and 1706 to select between the converters A1704 and B1705 based on the color difference information read from the color difference information reader 1702. Thus, the appropriate converter can be used to convert the color difference signal in order to avoid the unwanted degradation of the color difference signal.

The position at which the color difference information is to be recorded is arbitrary, this embodiment is also applicable to signals conforming to standards different from those described above, and the number of standards dealt with is arbitrary.

Embodiment 19

A nineteenth embodiment of this invention is described below.

An image signal encoding method according to the nineteenth embodiment records on a compressed stream including low-efficiency-encoded data, color difference information determining the sample position of a color difference signal relative to a luminance signal. In decoding low-efficiency-encoded data, this embodiment can avoid the unwanted degradation of the color difference signal caused by an error in conversion and encode a plurality of types of signals using the same encoder.

The position at which the color difference information for determining the sample position of the color difference signal is to be recorded is arbitrary, this embodiment is also applicable to signals conforming to standards different from the SMPTE294M and MPEG standards, and the number of standards dealt with is arbitrary.

Embodiment 20

Figure 18:
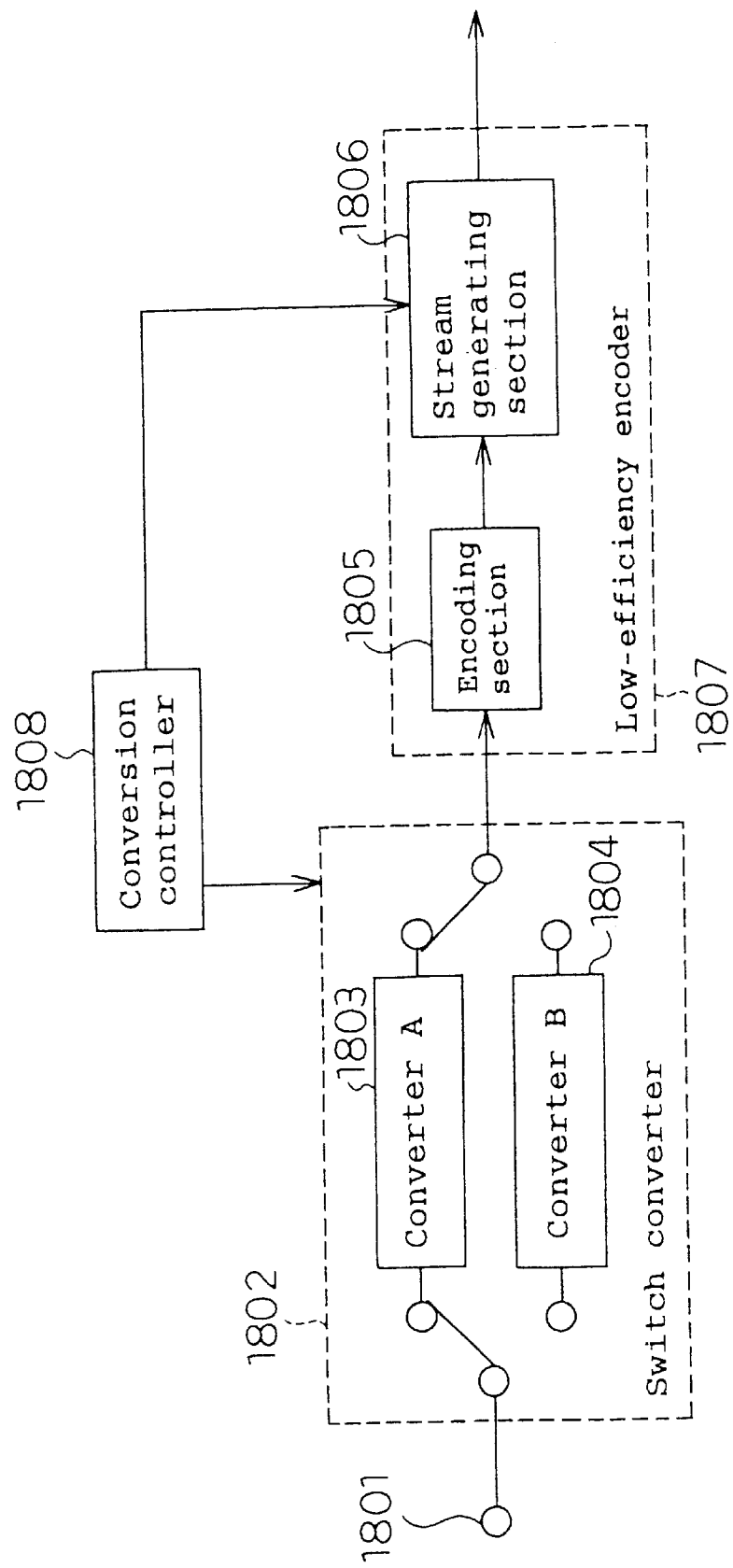
FIG. 18 is a block diagram describing an image-signal encoding apparatus according to a twentieth embodiment of this invention.

FIG. 18 is a block diagram of an image signal encoding apparatus according to a twentieth embodiment of this invention. Reference numeral 1801 designates an input terminal that inputs an 844 signal that is a progressive scanning signal; 1803 is a converter A that applies down-conversion for the characteristics of SMPTE294M to a color difference signal in the input signal; 1804 is a converter B that applies down-conversion for the characteristics of MPEG to the color difference signal in the input signal; 1802 is a switch converter (a conversion means) that switches between the converters A1803 and B1804 to convert the input signal; 1805 is an encoding section (an encoding means) for low-efficiency-encoding the input signal; 1806 is a stream generating section (a multiplexing means) for generating a compressed stream using the low-efficiency-encoded data and additional information (color difference information and information on low-efficiency encoding); 1807 is a low-efficiency encoder consisting of the encoding section 1805 and the stream generating section 1806; and 1808 is a conversion controller that outputs a switch control signal to the switch converter 1802 and that outputs to the stream generating section 1806 color difference information indicating the sample position of the color difference signal.

An operation of an image signal encoding apparatus of this configuration is described.

An 844 signal that is a progressive scanning signal is input through the input terminal 1801. In order to obtain a 420p signal for the sample position of a desired color difference signal, the switch converter 1802 switches between the converters A1803 and B1804 based on the control signal from the conversion controller 1808 to convert the 844 signal into a 420p signal. The converter A1803 is selected if an SMPTE294M-standard-conforming signal is desired as the 420p signal, whereas the converter B1804 is selected if an MPEG-standard-conforming signal is desired as the 420p signal. The conversion controller 1808 outputs to the low-efficiency encoder 1807 the color difference information obtained from the converter A1803 or B1804 and indicating the sample position of the color difference signal. In the low-efficiency encoder 1807, the encoding section 1805 low-efficiency-encodes the converted 420p signal output from the switch converter 1802 and stream generating section 1806 then adds to the low-efficiency-encoded image signal the color difference information from the conversion controller 1808 and information on the low-bit-rate encoding to generate a compressed stream for output.

As described above, this embodiment allows the stream generating section 1806 to record within the compressed stream the color difference information on the sample position of the color difference signal from the converter used by the switch converter 1802 to prevent the unwanted degradation of the image quality caused by an error in converting the color difference signal during decoding.

This embodiment is also applicable to signals conforming to standards different from those described above, the number of standards dealt with is arbitrary, and the position at which the color difference information is to be recorded is arbitrary.

Embodiment 21

Figure 19:
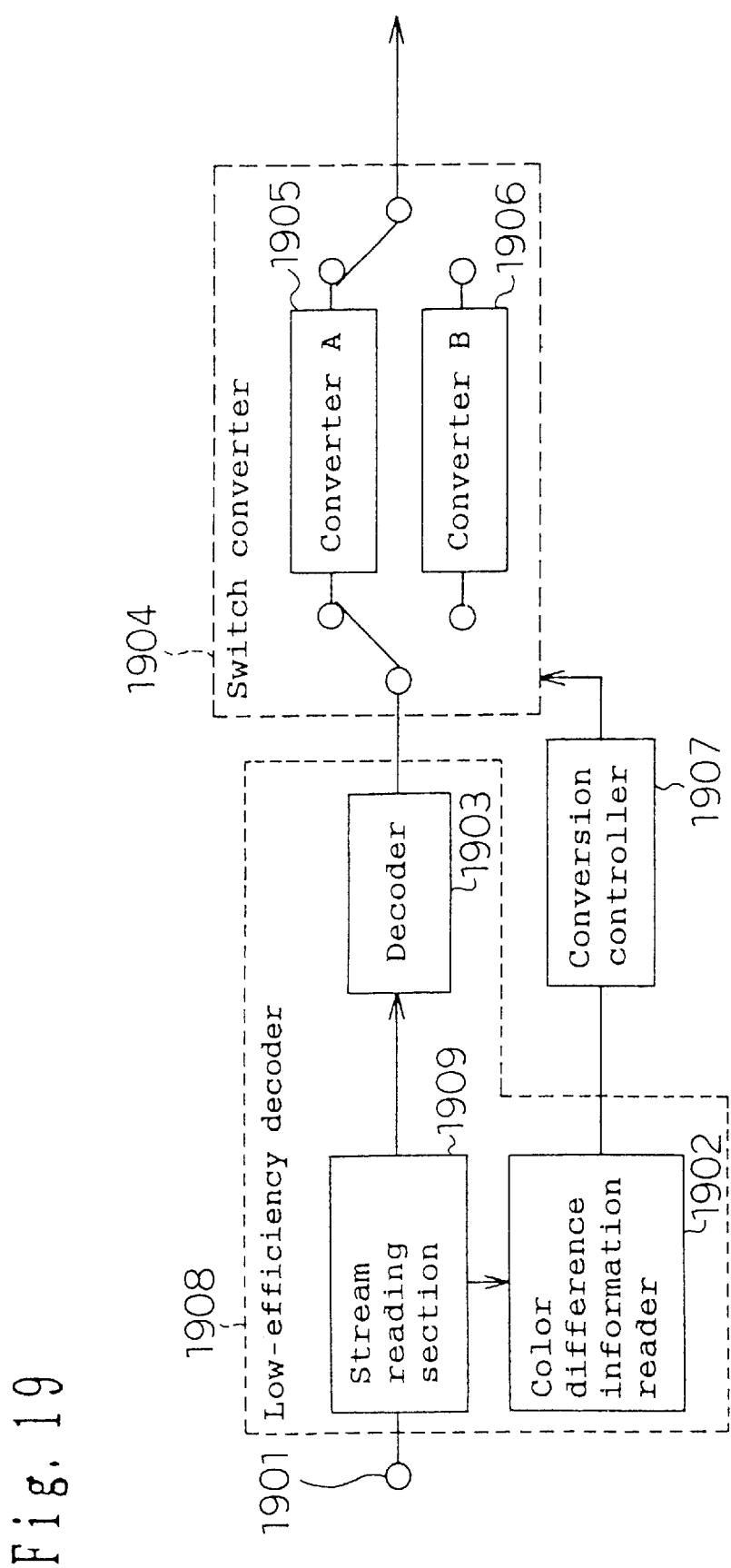
FIG. 19 is a block diagram describing an image-signal decoding apparatus according to a twenty-first embodiment of this invention.

FIG. 19 is a block diagram of an image signal decoding apparatus according to a twenty-first embodiment of this invention. Reference numeral 1901 designates an input terminal that inputs a compressed stream of progressive scanning signals; 1909 is a stream reading section; 1902 is a color difference information reader that reads from the input compressed stream, color difference information on the sample position of a color difference signal; 1903 is a decoder (a decoding means) that low-efficiency-decodes the compressed stream; 1905 is a converter A that applies to the input signal, up-conversion for the characteristics of SMPTE294M; 1906 is a converter B that applies to the input signal, up-conversion for the characteristics of MPEG; 1904 is a switch converter (a conversion means) that switches between the converters A1905 and B1906 to convert the input signal; and 1907 is a conversion controller that outputs a switch control signal to the switch converter 1904 depending on the output from the color difference information reader 1902. In addition, the stream reading section 1909, the color difference information reader 1902, and the decoder 1903 constitute a low-efficiency decoder 1908.

An operation of an image signal decoding apparatus of this configuration is described.

A stream of compressed progressive scanning signals is input to the stream reading section 1909 of the low-efficiency decoder 1908 through the input terminal 1901. The compressed stream has color difference information on the sample position of a color difference signal added thereto, and the color difference information reader 1902 reads the color difference information from the compressed stream and outputs it to the conversion controller 1907. The decoder 1903 decodes the compressed stream into a 420p signal that is an image signal, and outputs it to the switch converter 1904. Based on the color difference information input from the color difference information reader 1902, the conversion controller 1907 outputs a control signal to the switch converter 1904. This signal switches between the converters A1905 and B1906 to convert the 420p signal that is an image signal into an 844 signal. Based on the color difference information, the converter A1905 is selected if the 420p signal input to the switch converter 1904 conforms to the SMPTE294M standard, while the converter B1906 is selected if the 420p signal input to the switch converter 1904 conforms to the MPEG standard.

As described above, this embodiment allows the switch converter 1904 to select an appropriate converter in order to provide appropriate conversion based on the color difference information read by the color difference information reader 1902, thereby reducing the degradation of the image quality of the color difference signal.

This embodiment is also applicable to signals conforming to standards different from those described above, and the number of standards dealt with is arbitrary, Embodiment 22

Figure 20:
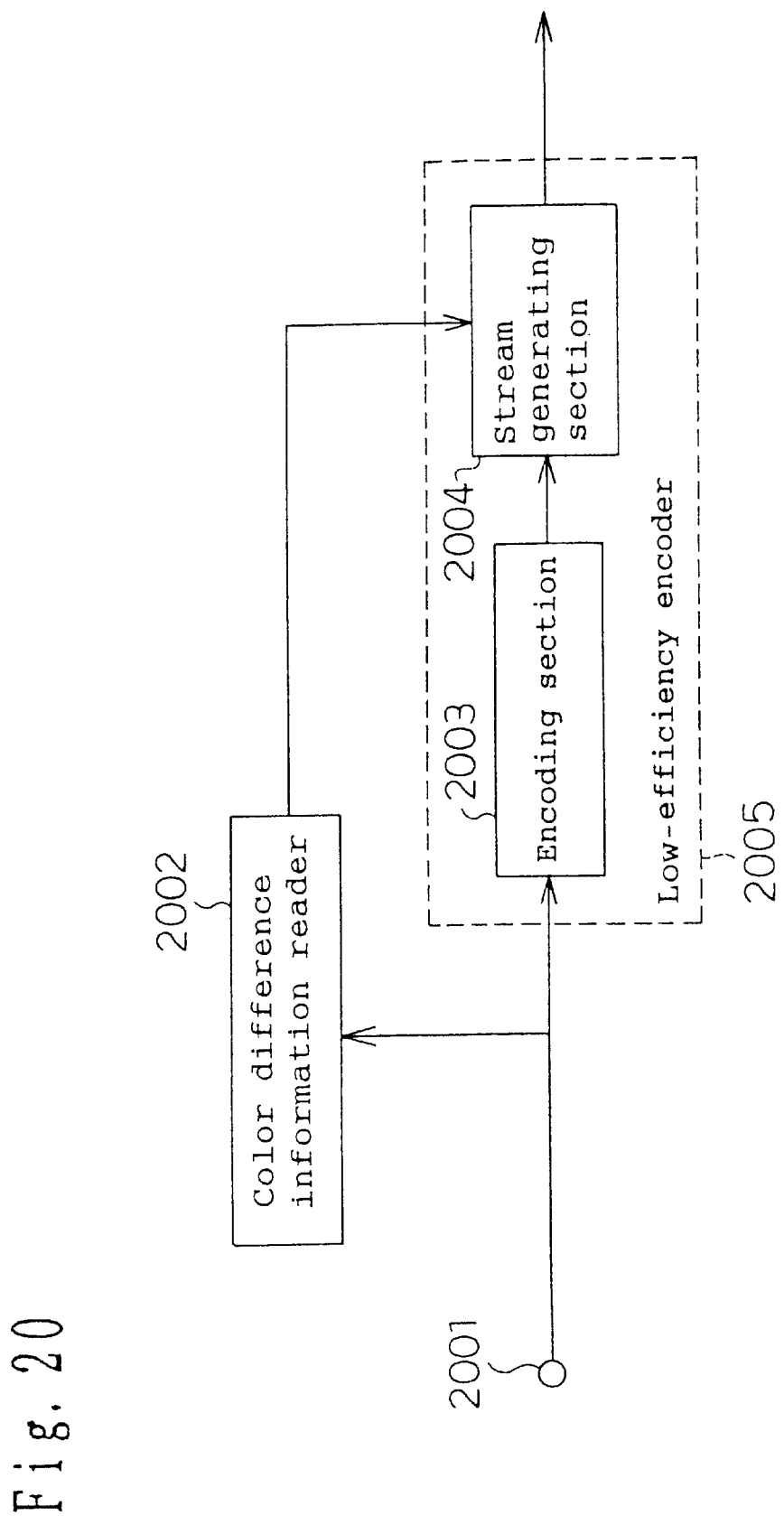
FIG. 20 is a block diagram describing an image-signal encoding apparatus according to a twenty-second embodiment of this invention.

FIG. 20 is a block diagram of an image signal encoding apparatus according to a twenty-second embodiment of this invention. Reference numeral 2001 designates an input terminal that inputs a 420p signal; 2002 is a color difference information reader that reads and outputs color difference information on the sample position of a color difference signal multiplexed with the 420p signal; 2003 is an encoding section for low-efficiency-encoding the 420p signal; 2004 is a stream generating means (a multiplexing means) for generating a compressed stream using the low-efficiency-encoded data and additional information (color difference information and information on low-efficiency encoding); and 2005 is a low-efficiency encoder consisting of the encoding section 2003 and the stream generating section 2004.

An operation of an image signal encoding apparatus of this configuration is described.

A 420p signal conforming to SMPTE294M or MPEG2 is input through the input terminal 2001. The color difference information reader 2002 determines to which standard the sample position of the input signal conforms, and outputs the result to the low-efficiency encoder 2005 as color difference information. The low-efficiency encoder 2005 uses the encoding section 2003 to low-efficiency-encode the input signal and outputs it to the stream generating section 2004. The stream generating section 2004 adds the color difference information and information on low-efficiency encoding to the low-efficiency-encoded input signal to generate a compressed stream for output.

As described above, this embodiment allows the stream generating section 2004 to generate a stream including the color difference information obtained by the color difference information reader 2002, thereby enabling compression without the duplicate application of a color filter to reduce the degradation of the image quality of the color difference signal.

This embodiment is also applicable to signals conforming to standards different from those described above, the number of standards dealt with is arbitrary, and the position at which the color difference information is recorded is arbitrary.

Embodiment 23

Figure 21:
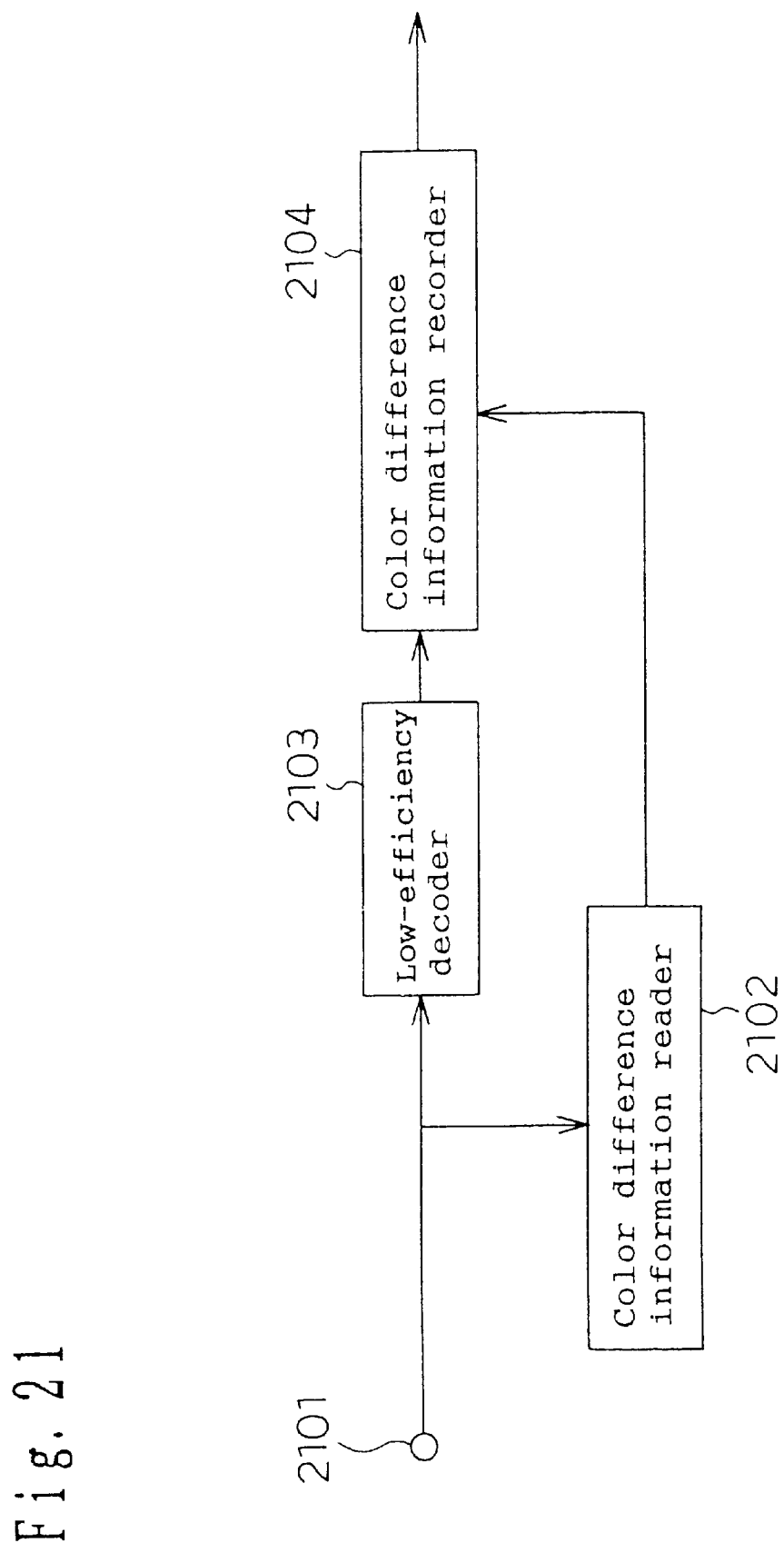
FIG. 21 is a block diagram describing an image-signal decoding apparatus according to a twenty-third embodiment of this invention.

FIG. 21 is a block diagram of an image signal decoding apparatus according to a twenty-third embodiment of this invention. Reference numeral 2101 designates an input terminal that inputs a compressed stream of progressive scanning signals; 2102 is a color difference information reader that reads from the input stream, color difference information on the sample position of a color difference signal; 2103 is a low-efficiency decoder that low-efficiency-decodes the input stream; 2104 is a color difference information recorder as a multiplexing means for recording the color difference information on the low-efficiency-decoded data.

An operation of an image signal decoding apparatus of this configuration is described.

A stream of compressed progressive scanning signals is input through the input terminal 2101. The compressed stream has color difference information on the sample position of a color difference signal multiplexed therewith, and the color difference information reader 2102 reads the color difference information from the input stream and outputs it to the color difference information recorder 2104. The low-efficiency decoder 2103 decodes the input stream into an image signal and outputs it to the color difference information recorder 2104. The color difference information recorder 2104 multiplexes the decoded image signal and the color difference information together.

As described above, this embodiment allows the color difference information reader 2102 to read the color difference information on the sample position of the color difference signal and allows the color difference information recorder 2104 to multiplex it on the output image signal together, thereby enabling the phase of the color difference signal in the output signal to be determined during decoding. Thus, for example, a 420p signal output from the color difference information recorder 2104 can be converted into an 844 signal using an appropriate converter, thereby reducing the degradation of the image quality of the color difference signal.

This embodiment is also applicable to signals conforming to standards different from those described above, and the number of standards dealt with is arbitrary. In addition, the position at which the color difference information is to be recorded is arbitrary.

Embodiment 24

Figure 22:
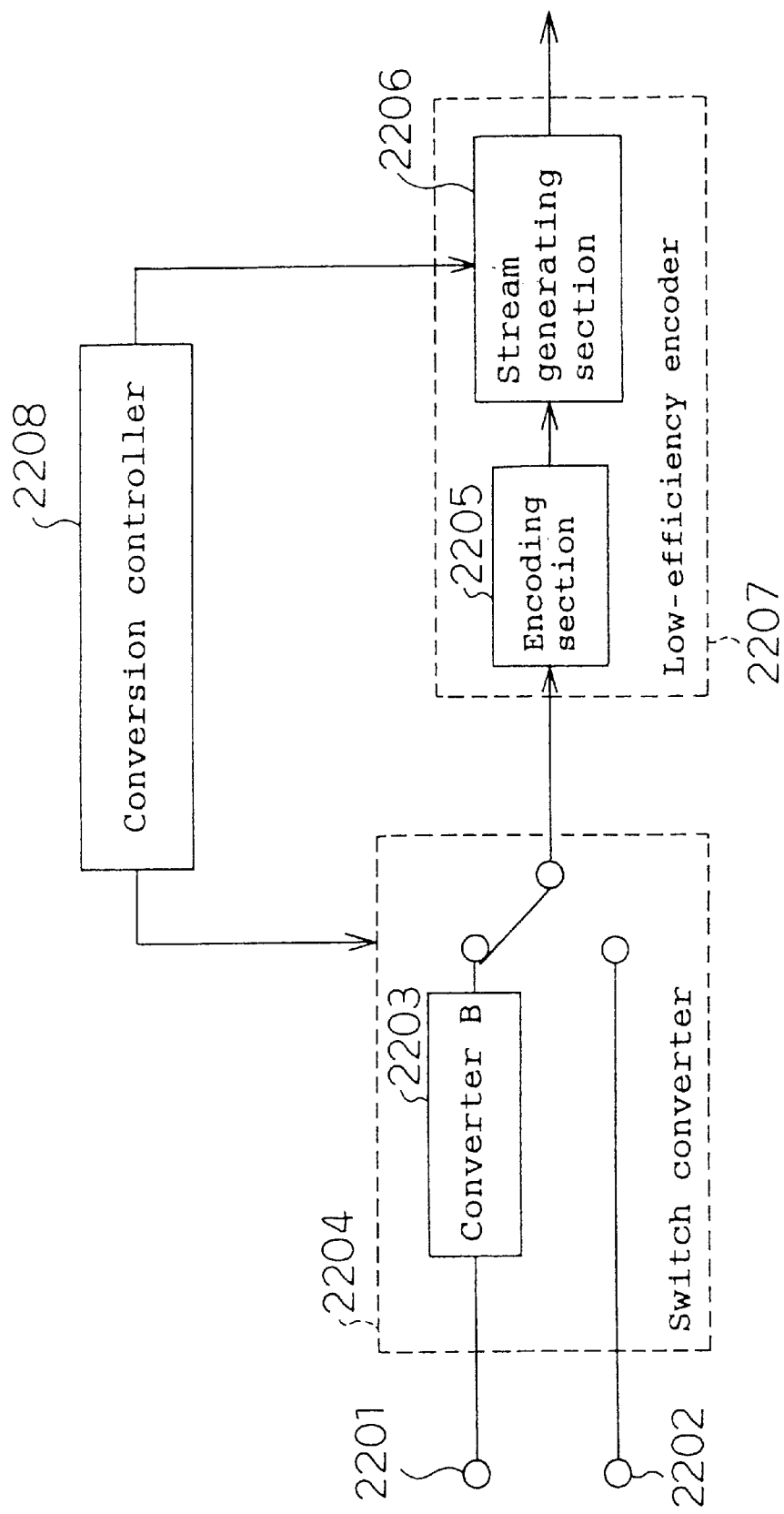
FIG. 22 is a block diagram describing an image-signal encoding apparatus according to a twenty-fourth embodiment of this invention.

FIG. 22 is a block diagram of an image signal encoding apparatus according to a twenty-fourth embodiment of this invention. Reference numeral 2201 designates an input terminal that inputs an 844 signal; 2202 is an input terminal that inputs an SMPTE294M-standard-conforming signal; 2203 is a converter B that converts the phase of a color difference signal in the input signal and the number of samples to apply to the color difference signal, down-conversion for the characteristics of MPEG; 2204 is a switch converter (a conversion means) that switches the input signal; 2205 is an encoding section for low-efficiency encode the input signal; 2206 is a stream generating means (a multiplexing means) for generating a compressed stream using the low-efficiency-encoded data and additional information (color difference information and information on low-efficiency encoding); 2207 is a low-efficiency encoder consisting of the encoding section 2205 and the stream generating section 2206; and 2208 is a conversion controller that outputs a switch control signal to the switch converter 2203 and that outputs to the stream generating section 2206 color difference information indicating the sample position of the color difference signal.

An operation of an image signal encoding apparatus of this configuration is described.

An 844 signal that is a progressive scanning signal is input through the input terminal 2201, while an SMPTE294M-standard-conforming signal is input through the input terminal 2202. In the switch converter 2204, based on a control signal from the conversion controller 2208, the converter B2203 down-converts the signal from the input terminal 2201 in such a way that the color difference signal therein becomes an MPEG-standard-conforming 420p signal, and passes through the signal from the input terminal 2202 to output it to the encoding section 2205 of the low-efficiency encoder 2207. In addition, the conversion controller 2208 outputs to the stream generating section 2206 of the low-efficiency encoder 2207, color difference information on the sample position of the color difference signal in the signal that is output to the encoding section 2205. The low-efficiency encoder 2207 low-efficiency-encodes the signal that is input to the encoding section 2205, and outputs it to the stream generating section 2206. The stream generating section 2206 adds to the low-efficiency-encoded image signal, the color difference information and information on the low-efficiency encoding to generate a compressed stream for output.

As described above, this embodiment allows the stream generating section 2206 to record within the compressed stream the sample position of the color difference signal in the signal that is output from the conversion controller 2208, thereby enabling compression without the duplicate application of a color filter to prevent the unwanted degradation of the image quality of the color difference signal.

This embodiment is also applicable to signals conforming to standards different from those described above, the number of standards dealt with is arbitrary, and the position at which the color difference information is to be recorded is arbitrary.

Embodiment 25

Figure 23:
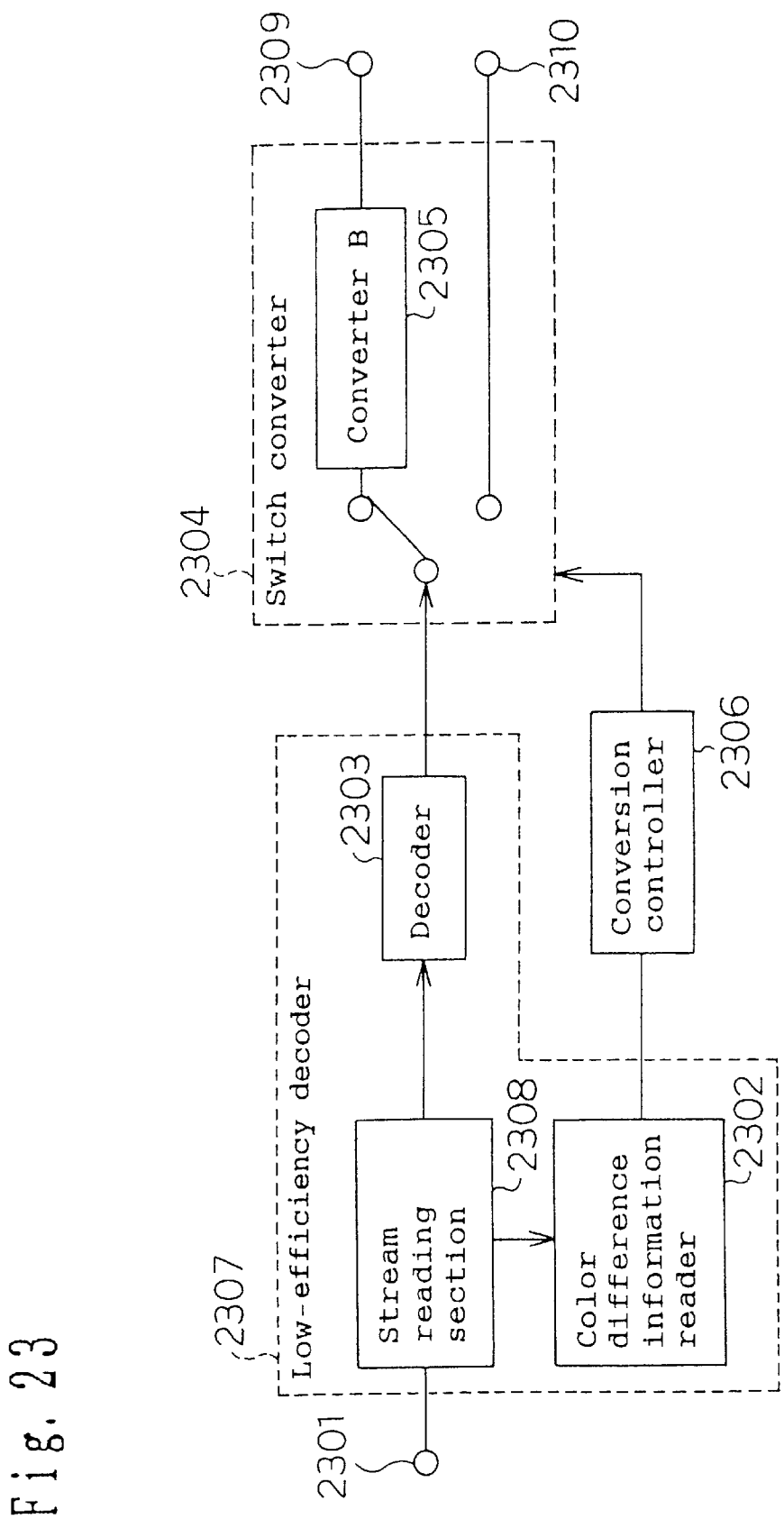
FIG. 23 is a block diagram describing an image-signal decoding apparatus according to a twenty-fifth embodiment of this invention.

FIG. 23 is a block diagram of an image signal decoding apparatus according to a twenty-fifth embodiment of this invention. Reference numeral 2301 designates an input terminal that inputs a compressed stream of progressive scanning signals; 2308 is a stream reading section; 2302 is a color difference information reader that reads from the input stream, color difference information on the sample position of a color difference signal; 2303 is a decoder that low-efficiency-decodes the input stream; 2305 is a converter B that converts the phase of a color difference signal in the input signal and the number of samples to apply to the color difference signal, up-conversion for the characteristics of MPEG; 2304 is a switch converter (a conversion means) that uses the converter B2305 to convert the input signal for output or that directly outputs the input signal; 2306 is a conversion controller that outputs a switch control signal to the switch converter 2304 depending on the output from the color difference information reader 2302; and 2309 and 2310 are output terminals. In addition, the stream reading section 2308, the color difference information reader 2302, and the decoder 2303 constitute a low-efficiency decoder 2307. An operation of an image signal decoding apparatus of this configuration is described.

A stream of compressed progressive scanning signals is input to the stream reading section 2308 of the low-efficiency decoder 2307 through the input terminal 2301. The input stream has color difference information on the sample position of a color difference signal multiplexed therewith, and the color difference information reader 2302 reads the color difference information from the input stream and outputs it to the conversion controller 2306. The decoder 2303 decodes the input stream into an image signal, and outputs it to the switch converter 2304. Based on the color difference information input from the color difference information reader 2302, the conversion controller 2306 outputs a control signal to the switch controller 2304. In the switch converter 2304, if the sample position of the input color difference information conforms to MPEG, the image signal is up-converted by the converter B2305 and output through the output terminal 2309, and otherwise the image signal is directly output to an SMPTE294M-standard-conforming transmission path through the output terminal 2310 without conversion.

As described above, this embodiment allows the switch converter 2304 to provide appropriate or no conversion based on the color difference information on the sample position of the color difference signal obtained from the color difference information reader 2302, thereby enabling the color difference signal to be appropriately processed to reduce the degradation of image quality.

This embodiment is also applicable to signals conforming to standards different from those described above, and the number of standards dealt with is arbitrary.

Embodiment 26

The invention according to Embodiments 26 to 30, which are described below, divides for each frame, a progressive image signal at a frame rate N (N is a positive real number indicating the number of frames/sec.) into two progressive image signals at a frame rate smaller than N, compressively encodes each of the two divided progressive signals to obtain two bit streams, and records these two bit streams on different recording layers of an optical disc. Consequently, a compressive encoding means and subsequent means can handle an image signal having the same rate as an interlaced image signal at a frame rate smaller than N.

The invention according to Embodiments 26 to 30 playbacks two bit streams from each of the different recording layers of the optical disc, extensionally decodes each of the bit streams to obtain two progressive image signal at a frame rate smaller than N (N is a positive real number indicating the number of frames/sec.), and synthesizes the two progressive image signals for each frame to output a progressive image signal at the frame rate N. Consequently, an extensional decoding means can handle an image signal having the same rate as an interlaced image signal at a frame rate smaller than N.

The twenty-sixth embodiment of this invention is described below with reference to the drawings.

Figure 24:
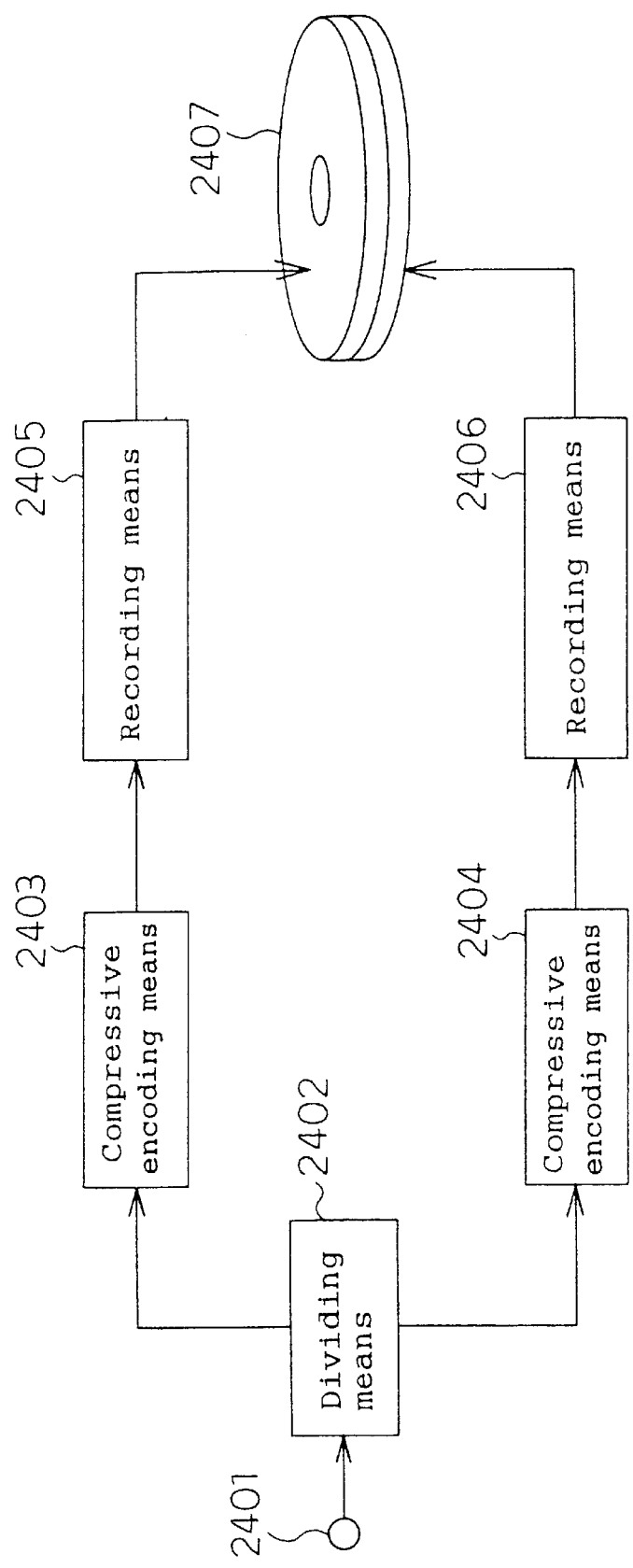
FIG. 24 is a block diagram showing a configuration of an optical-disc recording method according to a twenty-sixth embodiment of this invention.

FIG. 24 is a block diagram showing an optical-disc recording method according to the twenty-sixth embodiment of this invention. In this figure, 2401 is an input terminal through which a progressive image signal at a frame rate N (N is an integer that is 2 or more); 2402 is a dividing means for dividing the input image signal into two progressive image signals for each frame; 2403 and 2404 are compressive encoding means for compressively encoding the divided progressive image signals at a frame rate N/2; and 2405 and 2406 are recording means for recording on an optical disc 2407 bit streams output from the compressive encoding means 2403 and 2404. The optical disc 2407 has at least two recording layers and records the bit streams from the recording means 2405 and 2406 on different recording layers.

An operation of this embodiment is described.

First, the frame rate of a progressive image signal from the input terminal 2401 is assumed to be 60 frames/sec. The dividing means 2402 divides this progressive image signal into two progressive image signals at a frame rate of 30 frames/sec. When the signal is divided into two, it is desirably divided on a frame alternating basis. The divided progressive image signals at 30 frames/sec. are input to the compressive encoding means 2403 and 2404, respectively, in which the signals are compressively encoded using MPEG. If the progressive image signal from the input terminal 2401 is a 525p signal, compressive encoding means for NTSC image signals may be used as the compressive encoding means 2403 and 2404. This is because interlaced image signals are compressed in such a way that two fields become one frame.

In addition, the progressive image signal can be compressed without a problem because progressive image signals can be compressed at a higher compression rate than interlaced image signals. MPEG compression involving motion compensation can be executed accurately because it does not initially require the framing of two fields having different time axes as in interlaced image signals.

The method for dividing the progressive image signal into two may comprise dividing it for each line to obtain two interlaced image signals, but it is desirably divided into two progressive image signals in terms of compression efficiency.

The signals compressively encoded by the compressive encoding means 2403 and 2404 are input to the recording means 2405 and 2406, respectively, as bit streams. The recording means 2405 and 2406 record signals on the optical disc 2407 and consist of optical components such as semiconductor lasers or lenses. Such means, however, are well known and their detailed description is thus omitted. The recording means 2405 and 2406 record bit streams on recording layers of the optical disc 2407, and the two bit streams are recorded on different recording layers.

As described above, this embodiment allows conventional compressive encoding means for interlaced image signals to be directly used and also allows progressive image signals to be directly compressed, thereby avoiding a decrease in encoding efficiency caused by division.

Although this embodiment uses a frame rate of 60 frames/sec., a different frame rate such as 59.94 frames/sec. or 50 frames/sec. (625p) may be used. Of course, if a progressive image signal at 50 frames/sec. has been divided into two, a compressive encoding means for PAL image signals may be used. That is, no problem will occur if an encoder conforming to the MPEG standard is assumed.

In addition, the optical disc 2407 according to this embodiment must only record two signals on two different recording layers and may record the signals on two layers from only one side or the respective sides from both sides. The time required by the optical disc for recording is that same as the time required to record an NTSC image signal on one layer.

In addition, although this embodiment uses the two recording means 2405 and 2406 to record on the two layers of the optical disc, one recording means may be used to record on the two layers using time-sharing control.

Embodiment 27

Figure 25:
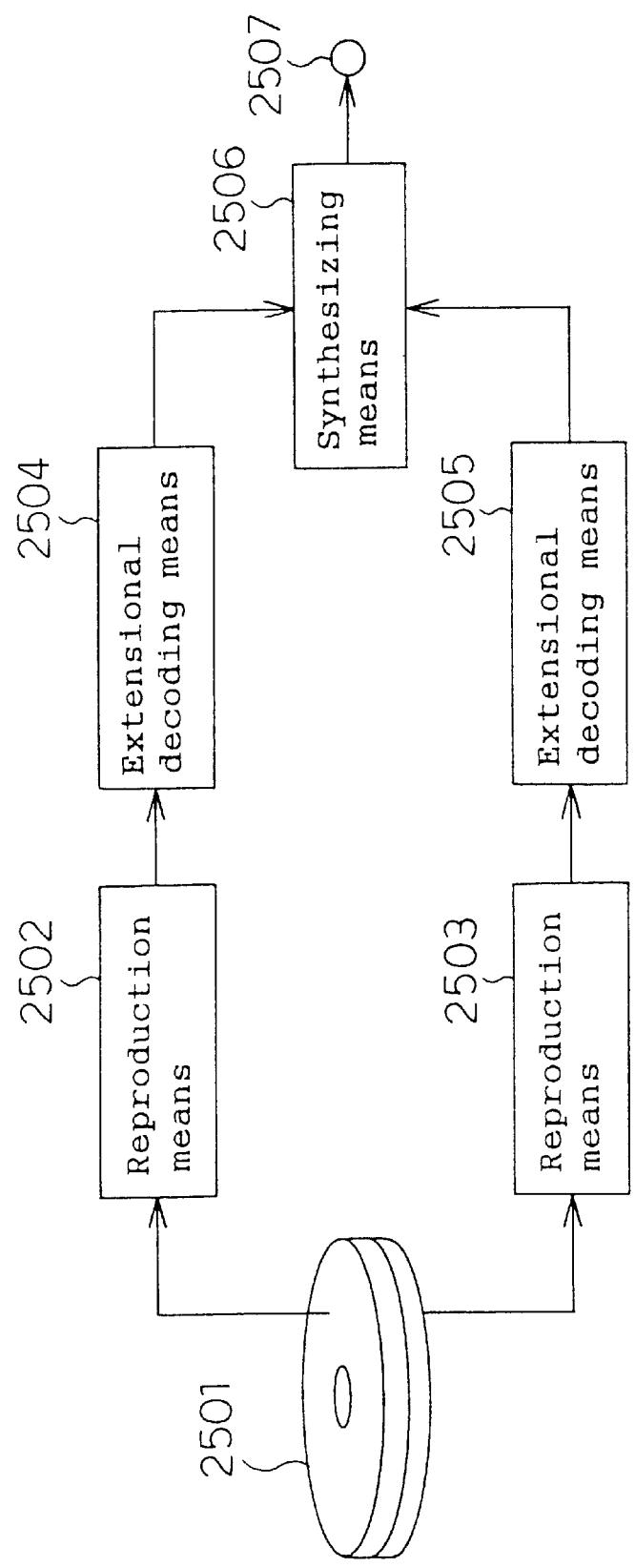
FIG. 25 is a block diagram showing a configuration of an optical-disc reproduction method according to a twenty-seventh embodiment of this invention.

FIG. 25 is a block diagram showing an optical-disc reproduction method according to a twenty-seventh embodiment of this invention. In this figure, 2501 is an optical disc, on which signals have been recorded using the method according to Embodiment 26. Reference numerals 2502 and 2503 denote reproduction means for reproducing bit streams from different recording layers of the optical disc 2501; 2504 and 2505 are extensional decoding means for extensionally decoding the bit streams from the reproduction means 2502 and 2503; 2506 is a synthesizing means for synthesizing progressive image signals at a frame rate N/2 from the extensional decoding means 2504 and 2505 into a progressive image signal at a frame rate N; and 2507 is an output terminal that outputs a progressive image signal from the synthesizing means 2506.

This embodiment provides processing reverse to that in Embodiment 26, so it does not particularly require description but only points are simply mentioned.

The extensional decoding means 2504 and 2505 according to this embodiment outputs progressive image signals at a frame rate N/2. Thus, like the compressive encoding means 2403 and 2404 shown in FIG. 24, the extensional decoding means 2504 and 2505 achieve the frame rate N/2 as in extensional decoding means for interlaced image signals. The synthesizing means 2506, which operates in the order reverse to that during recording, provides a progressive image signal at the frame rate N. Of course, at this point, a certain method is executed, for example, certain synchronizing information is inserted into the bit streams to achieve the same synthesizing order as during division.

As described above, this embodiment allows conventional extensional decoding means for interlaced image signals to be directly used to provide an apparatus for progressive image signals early.

In reproducing signals from two layers of the optical disc, this embodiment uses the two reproduction means 2502 and 2503 for reproduction. One reproduction means, however, may be used to playback signals from the two layers using time-sharing control.

Embodiment 28

Figure 26:
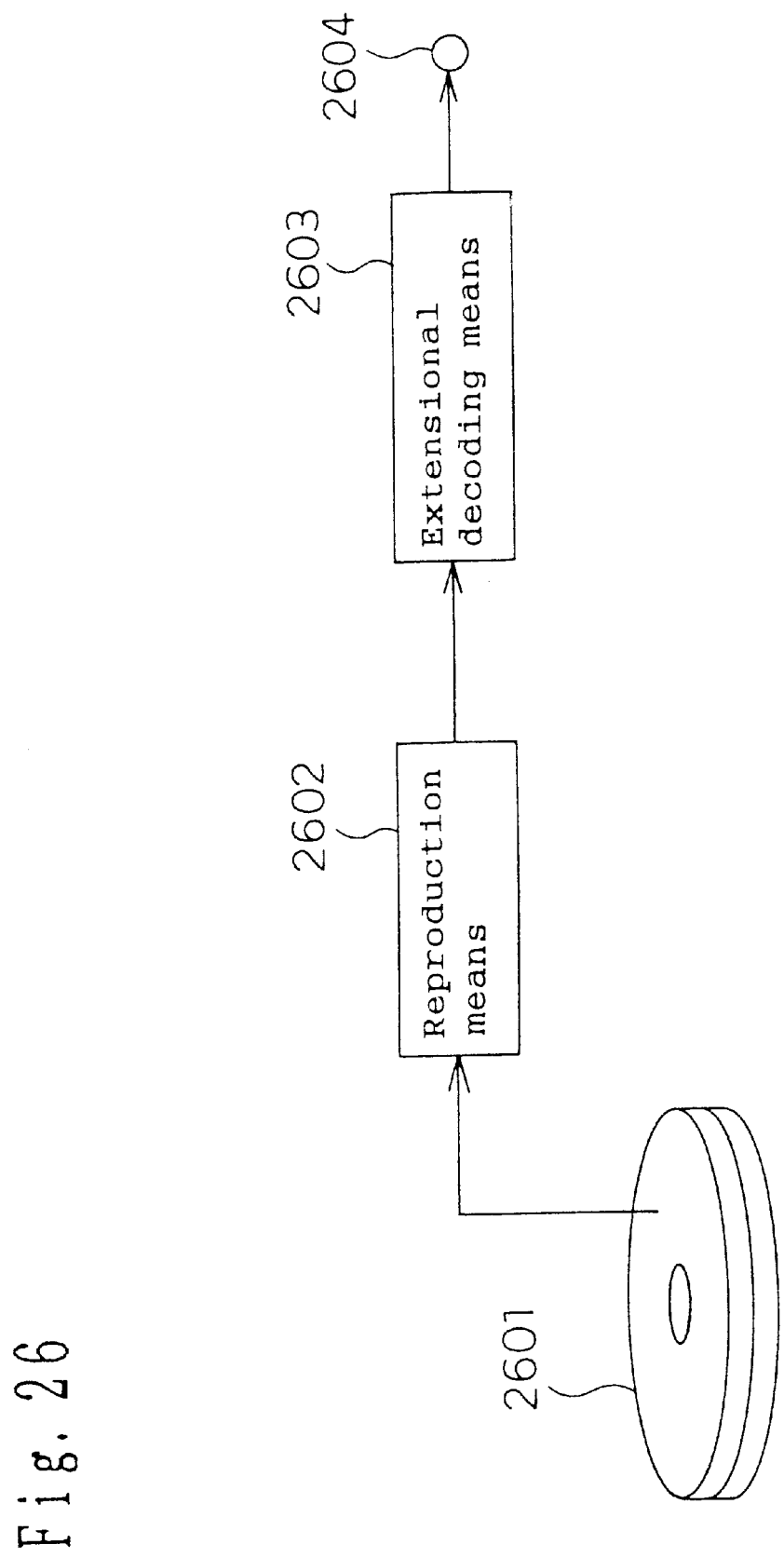
FIG. 26 is a block diagram showing a configuration of an optical-disc reproduction method according to a twenty-eighth embodiment of this invention.

FIG. 26 is a block diagram showing a configuration of an optical-disc reproduction method according to a twenty-eighth embodiment of this invention. Compared to FIG. 25 for Embodiment 27, the embodiment shown in FIG. 26 playbacks only one bit stream and omits the synthesizing means 2506. As a result, the output from the output terminal 2604 is a progressive image signal at the frame rate N/2 (for example, 30 frame/sec.).

This embodiment corresponds to a commercially available apparatus. Thus, it can simply playback the optical disc 2601 created using the recording method according to Embodiment 26.

Embodiment 29

Figure 27:
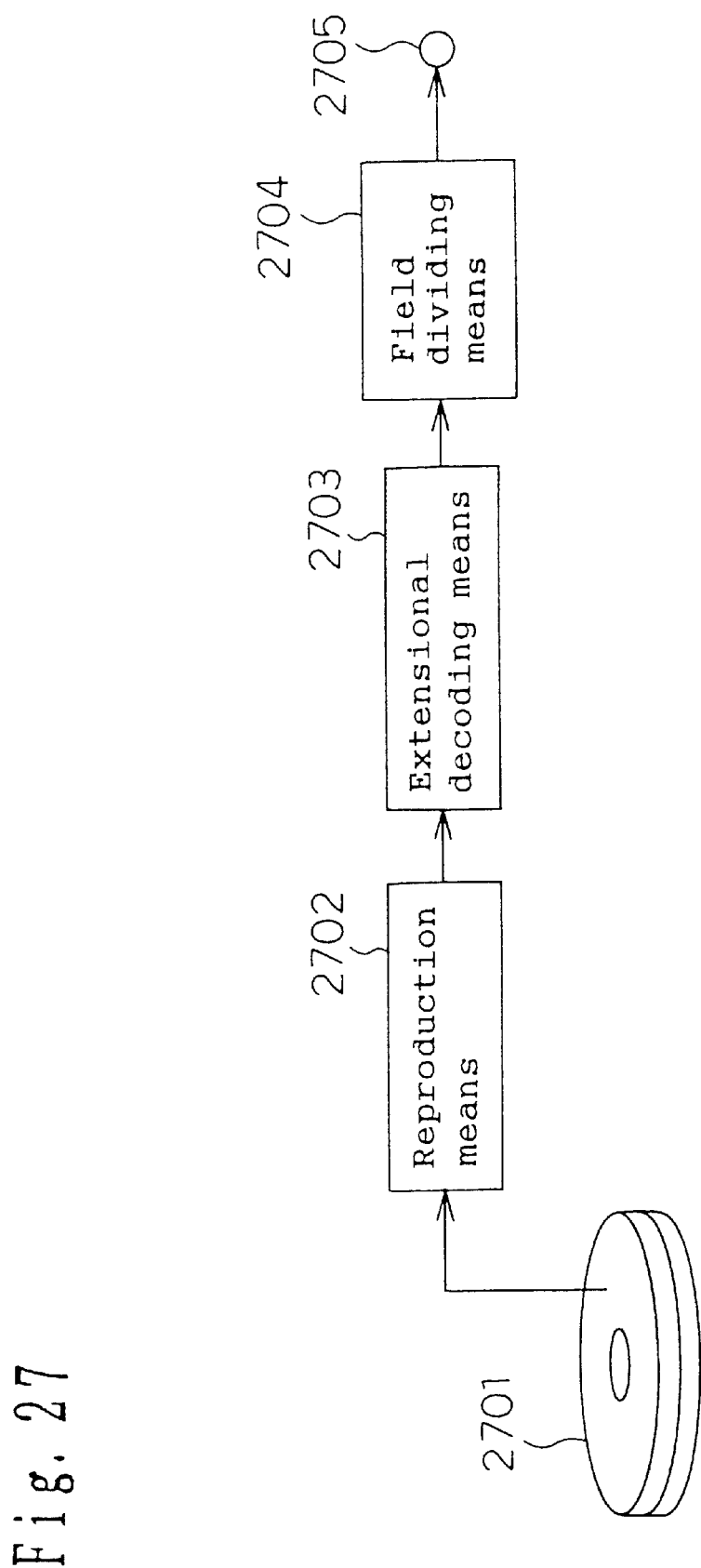
FIG. 27 is a block diagram showing a configuration of an optical-disc reproduction method according to a twenty-ninth embodiment of this invention.

FIG. 27 is a block diagram showing a configuration of an optical-disc reproduction method according to a twenty-ninth embodiment of this invention. Compared to FIG. 263 for Embodiment 28, the embodiment shown in FIG. 27 provides a field dividing means 2704 subsequent to the extensional decoding means 2703.

The field dividing means 2704 converts a progressive image signal at a frame rate N/2 output from the extensional decoding means 2703, into an interlaced image signal, and then outputs it through the output terminal 2705. Consequently, the output from the field dividing means 2704 is an interlaced image signal at the frame rate N/2 (an NTSC image signal is used if N=60). Thus, a normal monitor TV connected to the output terminal 2705 can be used to view the image.

As described above, this embodiment playbacks only one of two progressive image signals that have been divided to have a half rate and recorded on different layers, extensionally decodes it into an interlaced image signal, and then converts it into an interlaced image signal for output, thereby enabling the simple reproduction of the optical disc 2701 created using the recording method according to Embodiment 26.

The field may be divided by delaying every other horizontal line by 0 or 1/N second or providing spatial or temporal filtering before output.

Embodiment 30

Figure 28:
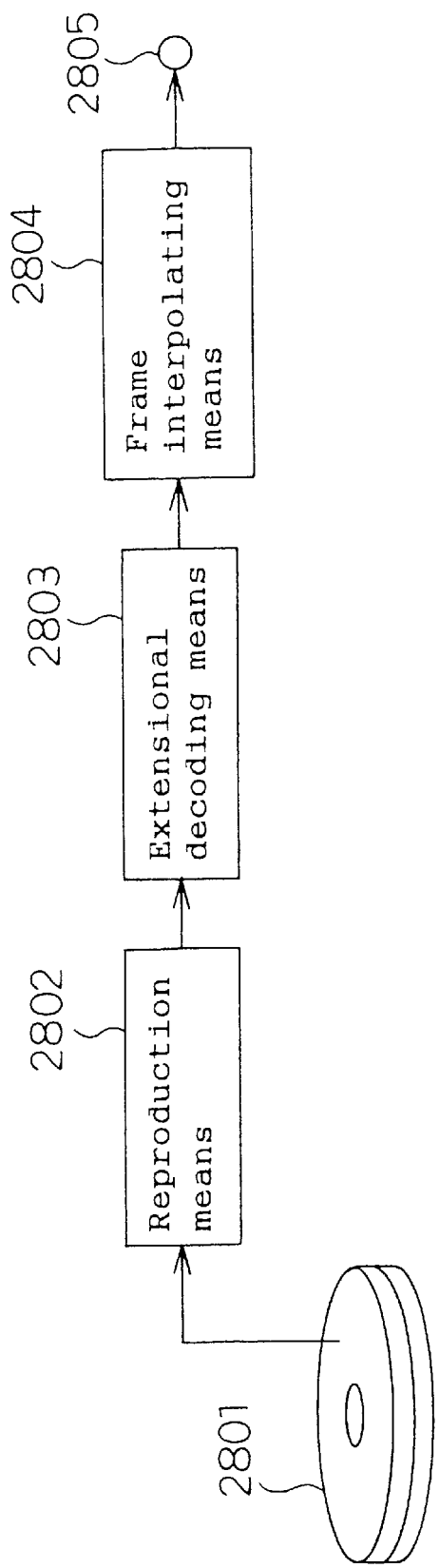
FIG. 28 is a block diagram showing a configuration of an optical-disc reproduction method according to a thirtieth embodiment of this invention.

FIG. 28 is a block diagram showing a configuration of an optical disc reproduction method according to a thirtieth embodiment of this invention. Compared to FIG. 26 for Embodiment 28, the embodiment shown in FIG. 28 provides a frame interpolating means 2804 subsequent to the extensional decoding means 2803.

The frame interpolating means 2804 converts a progressive image signal at a frame rate N/2 output from the extensional decoding means 2803, into a progressive image signal at a frame rate N, and then outputs it through the output terminal 2805. The frame interpolation can be executed by, for example, outputting one frame twice. This is shown in FIG. 29.

In FIG. 29, since the output from the extensional decoding means 2803 is at the frame rate N/2 as shown in FIG. 29(a), it will be as shown in FIG. 29(b) if one frame is output twice at the frame rate N.

In addition, to obtain a progressive image signal at the frame rate N as shown in FIG. 29(b), a frame for interpolation can be filtered using a frame preceding or following the first frame. In this case, the pixels at the same position of a first frame and its preceding or following frame may be simply added together and the result may be divided by two, or the correlationship (or motions) between a first frame and its preceding or following frame may be detected to adaptively change filtering.

Alternatively, a progressive image signal at the frame rate N/2 may be converted into one at a frame rate other than N for output. For example, FIG. 29(c) shows an interpolation (pull down) method used to convert into a frame rate 1.2×N. In FIG. 29(c), the frames of an image signal at the frame rate N/2 as shown in FIG. 29(a) is repeatedly output three times, twice, three times, twice, twice, ... to obtain a frame rate 2.4 times as large as the original one. That is, the frame rate N/2 is converted into the frame rate 1.2×N. Thus, if the frame rate N is, for example, 60 frames/sec., the output will have a frame rate of 72 frames/sec., which can be output to a display of a personal computer which is compatible with a high frame rate. In addition, if the frame rate N is 50 frames/sec., the output will have a frame rate of 60 frames/sec. and the frame rate can be converted.

As described above, this embodiment playbacks only one of two progressive image signals that have been divided to have a half rate and recorded on different layers, extensionally decodes it, and then converts it into a progressive image signal at a frame rate twice or 2.4 times as large as that of the original signal for output. Thus, the optical disc 2801 created using the recording method according to Embodiment 26 can be simply playbackd as a progressive image signal.

Although Embodiments 26 to 30 divides a progressive image signal at the frame rate N into two on a frame alternating basis to obtain a progressive image signal at the frame rate N/2, the signal need not be divided into equal frames as long as the resultant frame rate will be smaller than N. For example, a progressive image signal at a frame rate of 50 frames/sec. may be divided into two at frame ates of 30 and 20 frames/sec., respectively, or frames belonging to both systems are periodically provided (for example, once every five frames) to divide a progressive image signal at a frame rate of 50 frames/sec. into two at a frame rate of 30 frames/sec. In summary, only a frame rate smaller than the original one must be provided.

In addition, although in Embodiments 26 to 30, two bit streams obtained by compressively encoding divided progressive image signals desirably have the same bit rate taking the recording time into account, this applies to signals including information other than image signals. If two divided progressive image signals have different frame rates (or compressively encoded bit rates), additional information such as a header or audio information may be appended to only one of the two bit streams to effectively use two recording layers.

In addition, although Embodiments 26 to 30 use the optical disc, this invention is not limited to this aspect but other optical recording media, for example, optical magnetic discs may be used.

Industrial Applicability

This invention provides an encoding apparatus for accurately determining motion vectors to encode two types of image signals of different resolutions and a decoding apparatus for decoding signals encoded by the encoding apparatus.

What is claimed is:

1. An image signal encoding apparatus for providing an encoded signal comprising:

an input terminal for receiving a first image signal having a high resolution;

motion vector detecting means, coupled to the input terminal, of detecting motion vectors in the first image signal;

resolution reducing means, coupled to the input terminal, of forming a second image signal having a low resolution from said first image signal;

image signal interpolating means, coupled to the resolution reducing means, of interpolating said second image signal to form an interpolated signal having a number of pixels the same as a number of pixels in the first image signal;

differential means, coupled to the motion vector detecting means and the image signal interpolating means, of determining a differential between said first image signal and said interpolated signal to form a differential signal;

an encoding means of using said motion vectors to low-efficiency-encode said differential signal and form an encoded signal; and an output terminal, coupled to the encoding means, for providing the encoded signal.

2. An image signal encoding apparatus for providing an encoded signal comprising:

an input terminal for receiving a first image signal having a high resolution;

motion vector detecting means, coupled to the input terminal, of detecting motion vectors in the first image signal;

resolution reducing means, coupled to the input terminal, of forming a second image signal having a low resolution from said first image signal;

second encoding means, coupled to the resolution reducing means, of encoding said second image signal to form a second encoded signal;

second decoding means, coupled to the second encoding means, of decoding said second encoded signal to form a second decoded signal;

image signal interpolating means, coupled to the second decoding means, of interpolating said second decoded signal to form an interpolated signal having a number of pixels the same as a number of pixels in the first image signal;

differential means, coupled to the motion vector detecting means and the image signal interpolating means, of determining a differential between said first image signal and said interpolated signal to form a differential signal; and first encoding means of using said motion vectors to low-efficiency-encode said differential signal and form a first encoded signal;

an output terminal, coupled to the first encoding means, for providing the first encoded signal.

3. An image signal decoding apparatus comprising:

a first input terminal for receiving a high-resolution compressed stream;

a second input terminal, separate from the first input terminal, for receiving a low-resolution compressed stream;

first decoding means of decoding the high-resolution compressed stream to obtain a first image signal;

second decoding means of decoding the low-resolution compressed stream to obtain a second image signal;

image signal interpolating means, coupled to the second decoding means, of interpolating said second image signal to form an interpolated signal having a number of pixels the same as a number of pixels in the first image signal; and adding means of adding said first image signal and said interpolated signal to form a decoded high-resolution signal as an output signal.

* * * * *

UNITED STATES PATENT AND TRADEMARK OFFICE
CERTIFICATE OF CORRECTION

PATENT NO.    : 6,614,846 B1
DATED         : September 2, 2003
INVENTOR(S)   : Yuji Fujiwara et al.

It is certified that error appears in the above-identified patent and that said Letters Patent is hereby corrected as shown below:

<u>Title page,</u>
Item [54], Title, delete the title in its entirety and insert:
-- METHODS AND APPARATUSES FOR TRANSMITTING, ENCODING, AND DECODING IMAGE SIGNALS, AND RECORDING AND REPRODUCTION METHOD FOR OPTICAL DISCS --

Signed and Sealed this

Twenty-fourth Day of February, 2004

JON W. DUDAS
*Acting Director of the United States Patent and Trademark Office*